(12) United States Patent
Koenig et al.

(10) Patent No.: US 10,595,475 B1
(45) Date of Patent: Mar. 24, 2020

(54) SYSTEM AND METHOD FOR PROVIDING SPROUT INCUBATION, AIR FLOW, HYDRATION, AND DRAINAGE

(71) Applicant: Sprouts 'R' Us, LLC, Huntington Station, NY (US)

(72) Inventors: Eric Koenig, Huntington, NY (US); Don DiLillo, Huntington Station, NY (US)

(73) Assignee: Sprouts 'R' Us, LLC, Huntington Station, NY (US)

( * ) Notice: Subject to any disclaimer, the term of this patent is extended or adjusted under 35 U.S.C. 154(b) by 0 days.

(21) Appl. No.: 16/407,971

(22) Filed: May 9, 2019

(51) Int. Cl.
| | |
|---|---|
| *A01G 31/02* | (2006.01) |
| *A01G 22/40* | (2018.01) |
| *B65D 43/02* | (2006.01) |
| *B65D 1/10* | (2006.01) |
| *B65D 23/08* | (2006.01) |

(52) U.S. Cl.
CPC ............. *A01G 22/40* (2018.02); *A01G 31/02* (2013.01); *B65D 1/10* (2013.01); *B65D 23/08* (2013.01); *B65D 43/0225* (2013.01)

(58) Field of Classification Search
CPC . A01G 9/00; A01G 9/02; A01G 9/029; A01G 9/0293; A01G 2009/003; A01G 31/00; B65D 1/10; B65D 81/3837; B65D 43/0225; B65D 43/0206; B65D 43/0212; B65D 43/0216; B65D 43/0222; B65D 43/0227; B65D 43/0231; B65D 3321/005; B65D 23/00

USPC ............ 47/58.1 R, 58.1 SE, 58.1 CF, 60, 61, 47/65.5, 65.7, 69

See application file for complete search history.

(56) References Cited

U.S. PATENT DOCUMENTS

| | | | | |
|---|---|---|---|---|
| 3,680,256 | A | * | 8/1972 | Kusumi ................. A01G 9/029 47/84 |
| 3,704,545 | A | * | 12/1972 | Van Reisen .............. A01G 9/02 47/69 |
| 3,911,619 | A | * | 10/1975 | Dedolph ................. A01G 31/02 47/14 |
| 4,006,557 | A | * | 2/1977 | Sawyer .................. A01G 31/02 47/61 |
| 4,180,941 | A | * | 1/1980 | Korematsu ............ A01G 31/02 47/14 |
| 4,291,493 | A | * | 9/1981 | Monson ................. A01G 31/02 47/14 |
| 4,551,942 | A | * | 11/1985 | Brown ..................... A01C 1/02 47/14 |

(Continued)

*Primary Examiner* — David J Parsley
*Assistant Examiner* — Danielle A Clerkley
(74) *Attorney, Agent, or Firm* — Georgiy L. Khayet

(57) ABSTRACT

Disclosed is a system for seed sprouting. An example system may include a jar having a top opening and a bottom opening, a seal lid, and a perforated lid. The system may include a seed packet containing seeds. A quantity of the seeds is calibrated based on a volume of the jar. The system may include a stand to support the jar vertically when the seeds are placed into the jar and moistened with water after the seal lid is secured at the bottom opening. The perforated lid includes holes to allow draining of the water after the perforated lid is secured at the top opening and the jar is positioned with the top opening down. The system may include a further perforated lid to be secured at the bottom opening after the jar is positioned with the top opening down to allow air to flow through the jar.

21 Claims, 26 Drawing Sheets

(56) References Cited

U.S. PATENT DOCUMENTS

| | | | | |
|---|---|---|---|---|
| 5,806,242 | A * | 9/1998 | Park | A01G 9/16 47/81 |
| 5,927,007 | A * | 7/1999 | Oda | A01G 31/02 47/60 |
| 5,930,951 | A * | 8/1999 | Wong | A01G 9/02 47/66.1 |
| 6,045,254 | A * | 4/2000 | Inbar | A61J 9/00 366/130 |
| 8,186,391 | B2 * | 5/2012 | Wilson | A47J 47/06 141/11 |
| 2006/0162251 | A1 * | 7/2006 | Yamaguchi | A01G 9/029 47/58.1 SE |
| 2008/0264895 | A1 * | 10/2008 | Prieto | B65D 43/0231 215/329 |
| 2009/0199472 | A1 * | 8/2009 | Ito | A01G 9/02 47/65.6 |
| 2011/0162271 | A1 * | 7/2011 | Schuler | A01G 9/0293 47/65.7 |
| 2017/0044043 | A1 * | 2/2017 | Date | B65D 1/00 |
| 2017/0172081 | A1 * | 6/2017 | Sramek | A01G 27/04 |

* cited by examiner

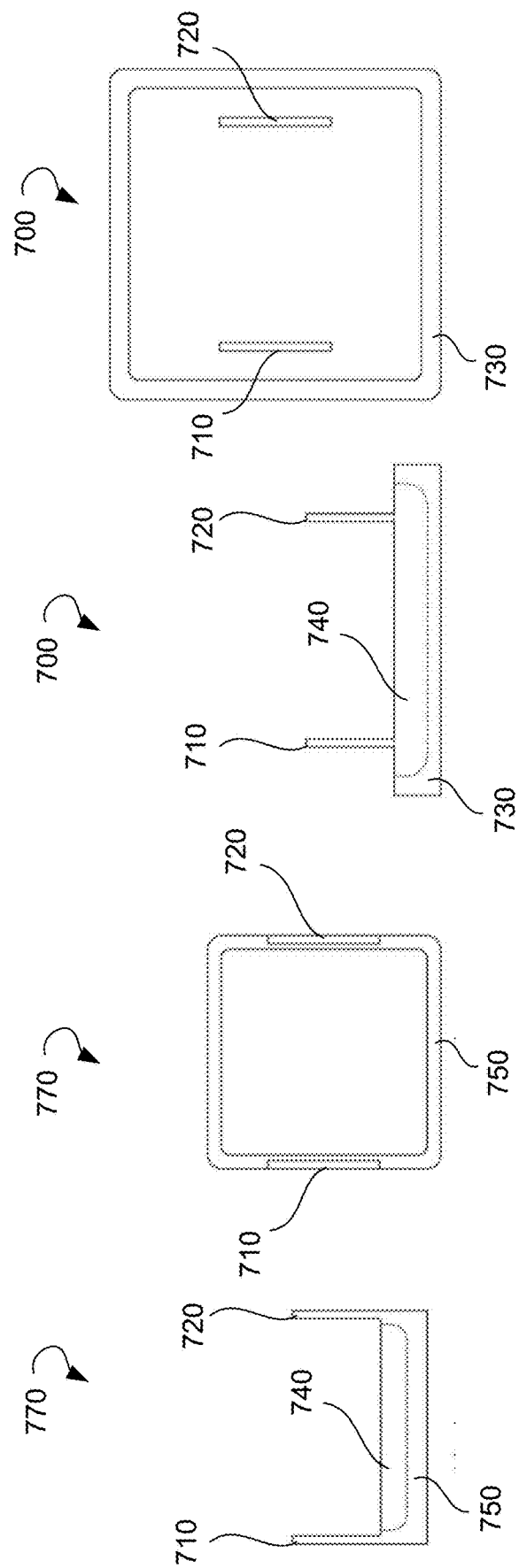

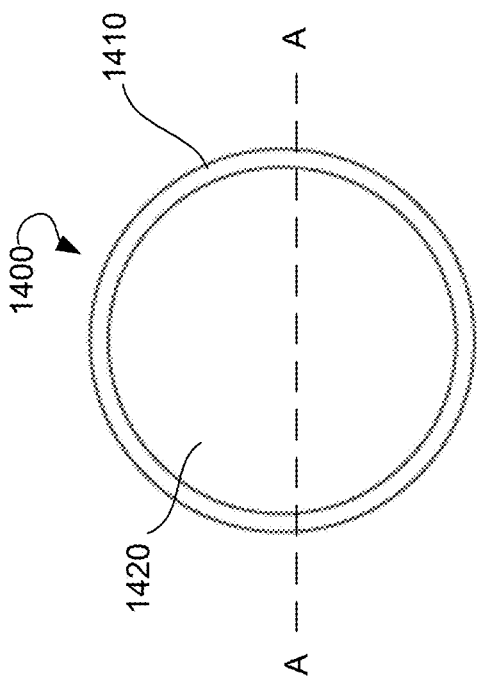
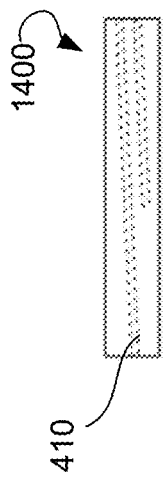
FIG. 14A
FIG. 14B
FIG. 14C Section A-A
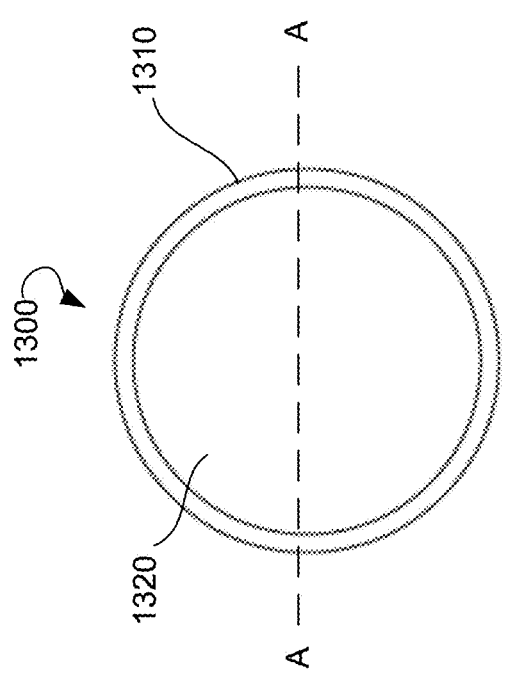
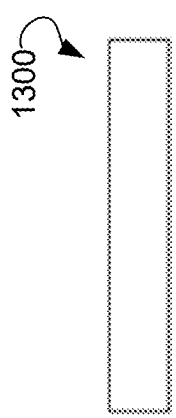
FIG. 13A
FIG. 13B
FIG. 13C Section A-A

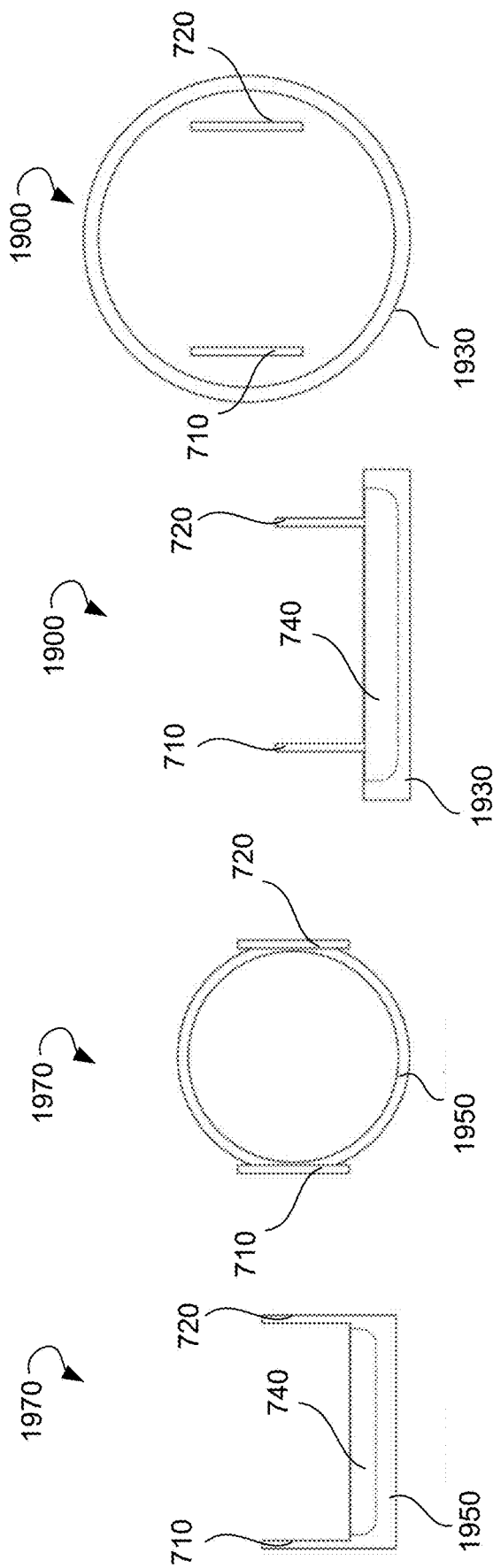

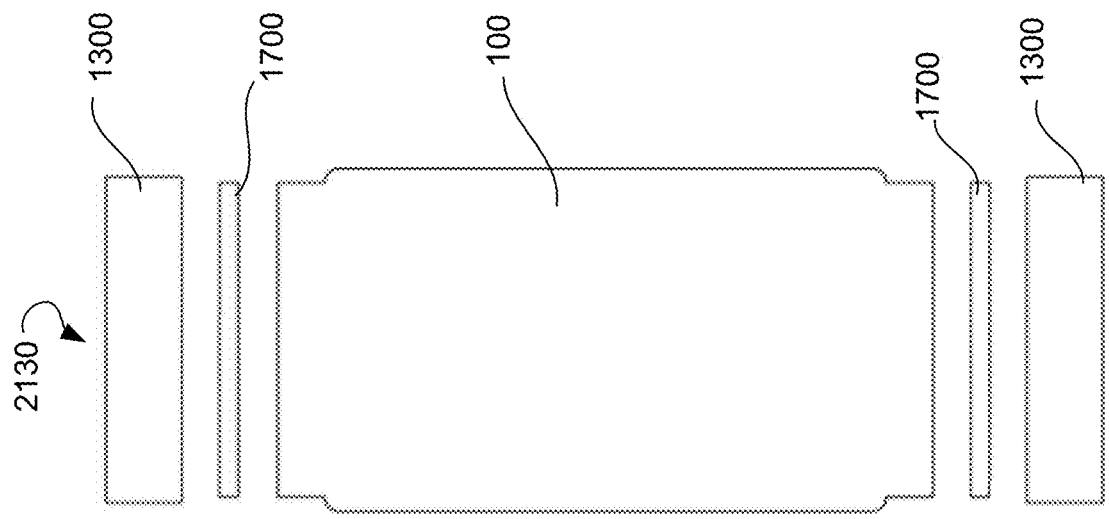
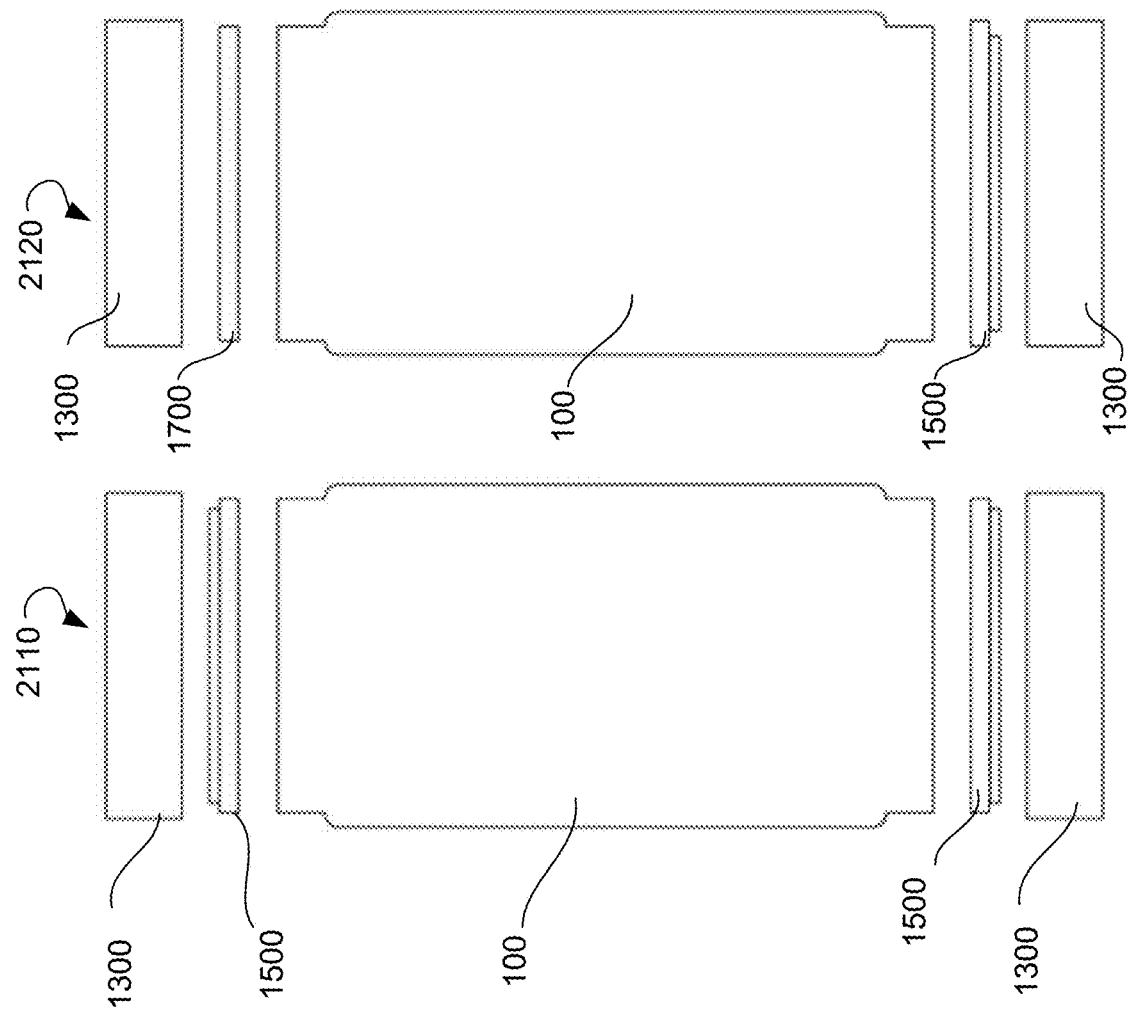
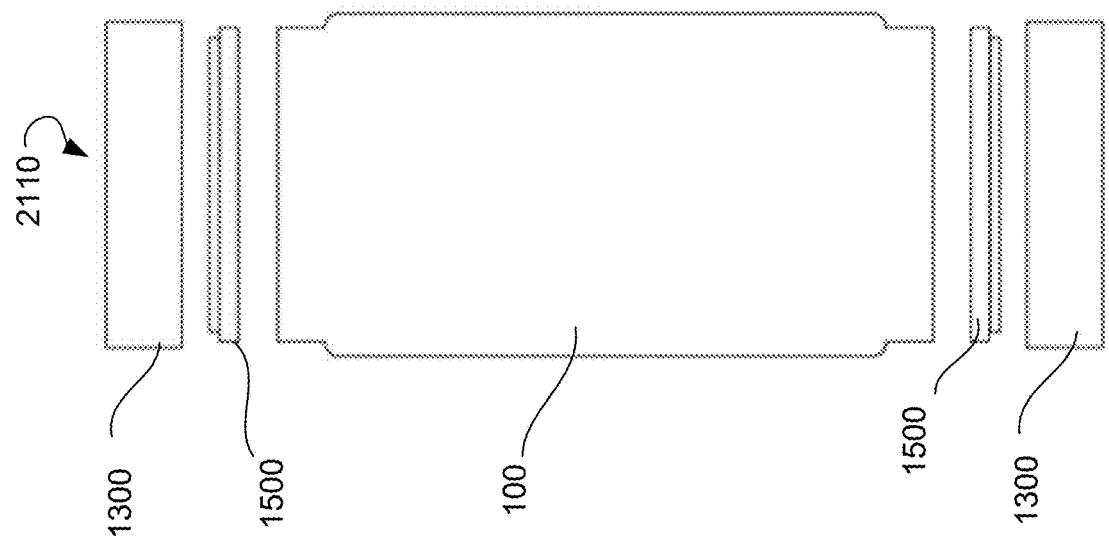
FIG. 21A
FIG. 21B
FIG. 21C

SYSTEM AND METHOD FOR PROVIDING SPROUT INCUBATION, AIR FLOW, HYDRATION, AND DRAINAGE

CROSS-REFERENCE TO RELATED APPLICATION

This application is related to U.S. application Ser. No. 16/408,105 titled "System and Method for Providing Smart Plant Incubation", filed on May 9, 2019. The subject matter of the aforementioned application is incorporated herein in its entirety for all purposes.

TECHNICAL FIELD

This disclosure generally relates to the field of sprouting seeds and, more particularly, to systems and methods for providing sprout incubation.

BACKGROUND

Sprouts are widely used as a source of nutrition and microelements helping digestion. Sprouts can be grown within jars. However, sprouting of seeds in jars requires a proper level of moisture, light, air flow, and amount of oxygen to be provided to the seeds to cause growth of the sprouts and reduce chances of bacteria growth and mold.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

This disclosure is directed to seed sprouting and more specifically to sprouting seeds using jars.

According to one example embodiment, a seed sprouting system is provided. The seed sprouting system may include a jar having a top opening and a bottom opening. The seed sprouting system may further include a sealing lid configured to be removably secured at the top opening of the jar or at the bottom opening of the jar. The seed sprouting system may further include a perforated lid configured to be removably secured at the top opening of the jar or at the bottom opening of the jar.

The jar can be made of glass, plastic, wood, metal, ceramic, vinyl, polymers, or any other material. The jar can be of a cylindrical shape, a triangular shape, a squared shape, a rectangular shape, a pentagonal shape, a hexagonal shape, an octagonal shape, or any other suitable shape. The seal lid can be configured to be removably secured to the jar using a fastening means. The perforated lid can also be configured to be removably secured to the jar with the fastening means. Both the seal lid and the perforated lid can be also configured to be removably secured to the top opening of jar or bottom opening of the jar secured using a fastening means such as, for example, a screw fastener, snap fastener, clasp fastener, magnetic fastener, latches, notches, suction, and so forth.

The seed sprouting system may further include a seed packet containing seeds. A quantity of the seeds can be calibrated based on a volume of the jar. After the seal lid is secured at the bottom opening of the jar, the seeds can be placed into the jar and moistened with a pre-determined amount of water. The seal lid may seal the bottom opening when the jar is positioned vertically with the top opening up.

The perforated lid may include one or more holes to allow draining of the water and prevent penetration of the moistened seeds after the perforated lid is secured at the top opening of the jar and the jar is inverted with the top opening facing down.

The seed sprouting system may further include a stand configured to support the jar vertically. The stand may include a tray for collecting the water drained from the jar.

The seed sprouting system may further include a further perforated lid to be secured at the bottom opening of the jar after the jar is inverted to be positioned with the top opening down and the bottom opening up. Prior to securing the further perforated lid, the seal lid can be removed from the bottom opening of the jar. The further perforated lid secured to the bottom opening may allow air to flow through the jar.

The seed sprouting system may include a further seal lid to be positioned on the top opening of the jar after the seeds have sprouted to allow storing the sprouts.

According to another example embodiment, a method for seed sprouting is provided. The method may include providing a jar having a top opening and a bottom opening. The method may further include providing a seal lid configured to be removably secured either at the top opening of the jar or the bottom opening of the jar. The method may further include providing a perforated lid configured to be removably secured at the top opening of the jar or the bottom opening of the jar. The jar can made of glass, plastic, wood, metal, ceramic, vinyl, polymers, or any other material. The jar can be of a cylindrical shape, a triangular shape, a squared shape, a rectangular shape, a pentagonal shape, a hexagonal shape, an octagonal shape, and any other shape. The seal lid can be configured to be removably secured to the jar using a fastening means. The perforated lid can be also configured to be removably secured to the jar using the fastening means.

The method may further include providing a seed packet containing seeds. A quantity of the seeds can be calibrated based on a volume of the jar. The seeds can be placed into the jar and moistened with a pre-determined amount of water after the seal lid is secured at the bottom opening of the jar. The seal lid may seal the bottom opening when the jar is positioned vertically with the top opening up.

The perforated lid may include one or more holes to allow draining of the water and preventing penetration of the moistened seeds after the perforated lid is secured at the top opening of the jar and the jar is inverted to be positioned with the top opening down.

The method may further include providing a stand configured to support the jar vertically. The stand may include a tray for collecting the water drained from the jar.

The method may further include providing a further perforated lid to be secured at the bottom opening of the jar after the jar is inverted to be positioned with the top opening down. Prior to attaching the further perforated lid, the seal lid can be removed from the bottom opening of the jar. The further perforated lid can be secured to the bottom opening to allow air to flow through the jar.

The method may include providing a further seal lid to be positioned on the top opening of the jar after the seeds have sprouted to allow storing the sprouts.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which:

FIG. 7A is a side view of a stand for a jar, according to an example embodiment.

FIG. 7B is a top view of the stand of FIG. 7A.

FIG. 7C is a side view of a stand for a jar, according to another example embodiment.

FIG. 7D is a top view of the stand of FIG. 7C.

FIG. 13A is a top view of an insert holder, according to an example embodiment.

FIG. 13B is a side view of the insert holder of FIG. 13A.

FIG. 13C is section view of the insert holder of FIG. 13A.

FIG. 14A is a top view of an insert holder with internal threads, according to an example embodiment.

FIG. 14B is a side view of the insert holder of FIG. 14A.

FIG. 14C is section view of the insert holder of FIG. 14A.

FIG. 19A is a side view of a stand for a jar, according to an example embodiment.

FIG. 19B is a top view of the stand of FIG. 19A.

FIG. 19C is a side view of a stand for a jar, according to an example embodiment.

FIG. 19D is a top view of the stand of FIG. 19C.

FIG. 21A is an exploded view of an assembly for seed sprouting, according to an example embodiment.

FIG. 21B is an exploded view of an assembly for seed sprouting, according to an example embodiment.

FIG. 21C is an exploded view of an assembly for seed sprouting, according an example embodiment.

DETAILED DESCRIPTION

Figure 1B:
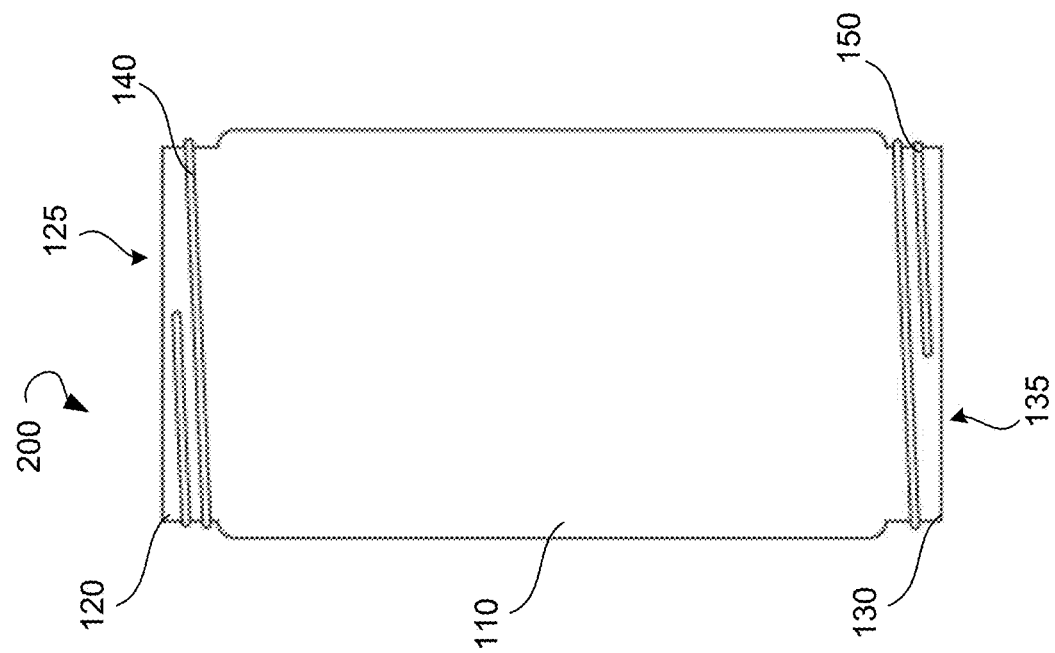
FIG. 1B is a side view of an example jar with external threads, according to another example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Embodiments of this disclosure generally relate to seed sprouting. A system for seed sprouting is provided. The system for seed sprouting may include a jar with a top opening and a bottom opening. The system may include a seal lid configured to be removably secured either at the top opening of the jar or the bottom opening of the jar. The system may further include a perforated lid configured to be removably secured at the top opening of the jar or the bottom opening of the jar. The system may include a seed packet containing seeds. A quantity of the seeds can be calibrated based on a variety of factors including but not limited to a species of the seed, the volume of the jar, and an amount of water required for sprouting. In some embodiments, seeds of a single species can be sprouted in the jar. In other embodiments, a mixture of seeds of two and more species can be sprouted in the same jar. The seeds can be placed into the jar and moistened with a pre-determined amount of water after the seal lid is secured at the bottom opening of the jar and the jar is positioned vertically with the top opening up. The perforated lid can be secured at the top opening of the jar for air ventilation.

After a pre-determined time, the jar can be inverted to be positioned with the top opening down. The perforated lid includes one or more holes to allow draining of the water and preventing penetration of the moistened seeds. The system may further include a stand configured to receive the jar with the perforated lid or the seal lid secured to the jar. The stand may support the jar vertically. The stand may include a tray for collecting the water drained from the jar after the jar has been inverted with the top opening down. The system may include a further perforated lid. The seal lid can be removed from the bottom opening of the jar and replaced with the further perforated lid when the jar is positioned with the bottom opening facing up. The further perforated lid may allow air to flow through the jar.

In some embodiments, the system for seed sprouting may include one or more insert holders configured to be removably secured at top opening or bottom opening of the jar. Each of the insert holders may include an opening. The system may include one or more seal inserts and one or more perforated inserts. An assembly of an insert holder and a seal insert can be used instead of the seal lid for preventing air and water flow at one of the opening of the jar. An assembly of an insert holder and a perforated insert can be used instead of the perforated lid to allow penetration of air and water and prevent penetration of moistened seeds.

In some embodiments, the system for seed sprouting may include one or more stands for supporting the jar vertically to allow the seeds in the jar to soak or allow drainage of the jar. The stand can be of different geometrical shape and size including but not limited square shape, circle shape, hexagon shape, and so forth. Each of the stands may include a drainage tray for collecting liquid from the jar. In some embodiments, the stands can be integrated into the seal lids, the perforated lids, or the insert holders.

In various embodiments, the jar, the seal lids, the perforated lids, the insert holders, and the inserts can be of different geometrical shape. The seal lids, the perforated lids, the insert holders can be secured to the jar by a fastening means, such as snap, screw fastener, twist, suction, magnet, or other securing mechanism.

In some embodiments, the stands and/or stands integrated into lids can be configured to be attachable to each other by sides. The stands can be attached to each other by a fastening means, such as snap, screw, twist, suction, magnet, or other securing mechanism. The stands attached to each other may allow to form farms of jars of different shape and size.

Figure 1A:
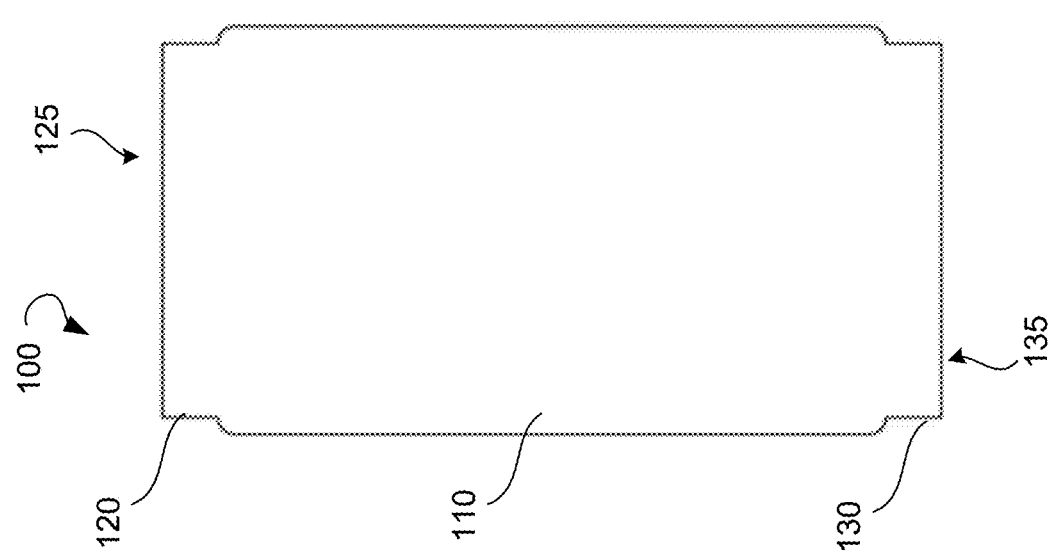
FIG. 1A is a side view of an example jar, according to an example embodiment.

Referring now to the drawings, FIG. 1A is a side view of a jar 100, according to an example embodiment. The jar 100 may include a body 110, a top jar neck 120, a bottom jar neck 130, a top opening 125, and a bottom opening 135. The jar 100 can be substantially of cylindrical shape. The jar 100 can be made of glass, plastic, wood, metal, ceramic, vinyl, polymers, or other material suitable for seed sprouting.

FIG. 1B is a side view of a jar 200, according to another example embodiment. The jar 200 may include a body 110, a top jar neck 120, a bottom jar neck 130, a top opening 125, and a bottom opening 135. The top jar neck 120 may include external thread 140 and the bottom jar neck 130 may include external thread 150. The jar 200 can be substantially of cylindrical shape. The jar 200 can be made of glass, plastic, wood, metal, ceramic, vinyl, polymers, or other material suitable for seed sprouting.

Figure 2B:
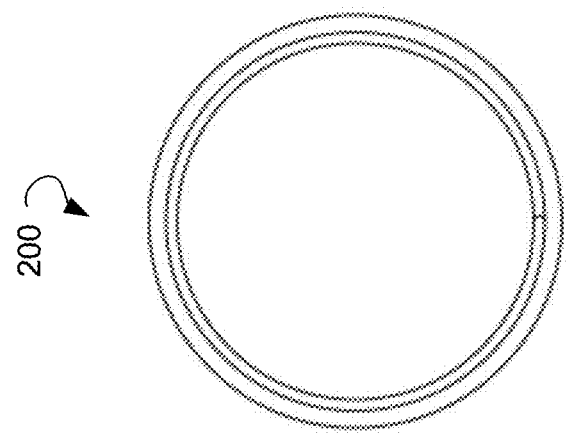
FIG. 2B is a top view of the example jar of FIG. 1B.
Figure 2A:
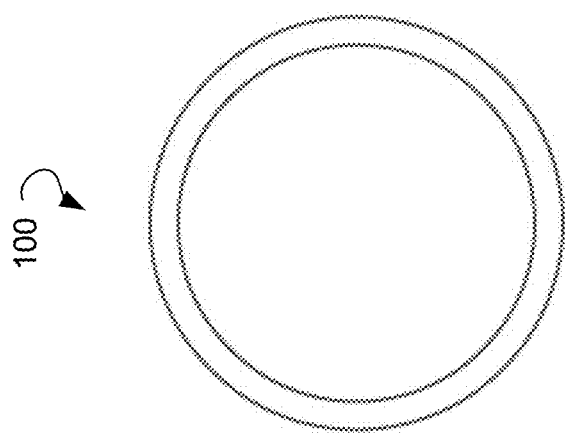
FIG. 2A is a top view of the example jar of FIG. 1A.

FIG. 2A is a top view of the example jar of FIG. 1A.

FIG. 2B is a top view of the example jar of FIG. 1B.

Figure 3A:
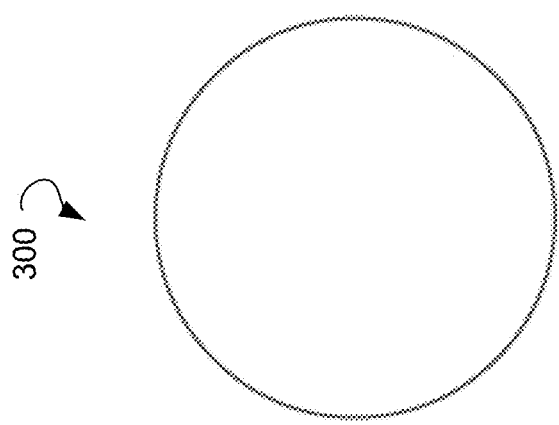
FIG. 3A is a top view of a sealed lid, according to an example embodiment.

FIG. 3A is a top view of a seal lid 300, according to an example embodiment. The sealed lid 300 can be configured to be removably secured at the top opening 125 or the bottom opening 135 of the jar 100. The height of the seal lid 300 can be substantially the same as the length of the top jar neck 120 or the bottom jar neck 130 of the jar 100. The internal diameter of the seal lid 300 can match the external diameter of the top jar neck 120 or the external diameter of the bottom jar neck 130. The seal lid can be secured at the top opening 125 or the bottom opening 135 of the jar 100 to prevent water penetration or air flow through the openings.

Figure 3B:
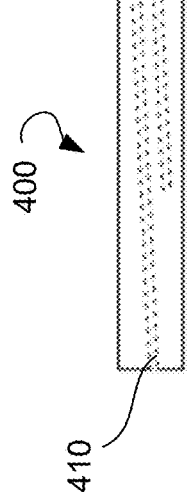
FIG. 3B is a side view of the sealed lid of the FIG. 3A.

FIG. 3B is a side view of the sealed lid 300 of the FIG. 3A.

Figure 4A:
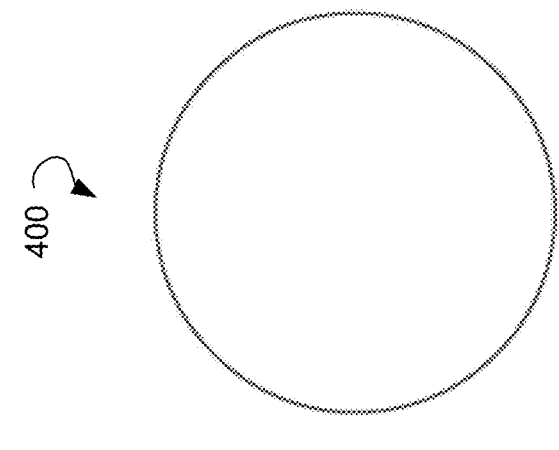
FIG. 4A is a top view of a sealed lid with internal thread, according to an example embodiment.

FIG. 4A is a top view of a sealed lid 400 with internal threads, according to an example embodiment. The seal lid 400 can be configured to be removably secured at the top opening 125 or the bottom opening 135 of the jar 200. The height of the seal lid 400 can be substantially the same as the length of the top jar neck 120 or the bottom jar neck 130. The internal diameter of the seal lid 400 can match the external diameter of the top jar neck 120 or the external diameter of the bottom jar neck 130. The seal lid 400 can be screwed at the top opening 125 or the bottom opening 135 of the jar 200 to prevent water penetration or air flow through the openings.

Figure 4B:
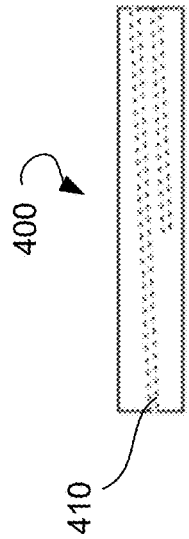
FIG. 4B is a side view of the sealed lid of the FIG. 4A.

FIG. 4B is a side view of the sealed lid 400 of the FIG. 4A. The seal lid 400 may include internal threads 410. The internal threads 410 can may allow threading the seal lid 400 onto the top jar neck 120 of the jar 200 using the external threads 140. The internal threads 410 may also allow threading the seal lid 400 onto the bottom jar neck 130 of the jar 200 using the external thread 140.

Figure 5A:
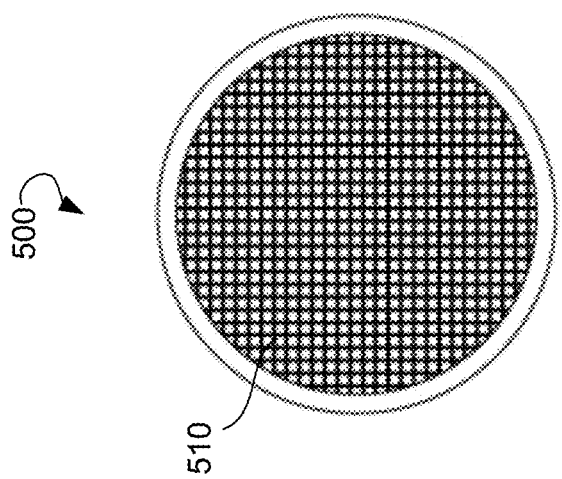
FIG. 5A is a top view of a perforated lid, according to an example embodiment.

FIG. 5A is a top view of a perforated lid 500, according to an example embodiment. The perforated lid 500 can be configured to be removably secured at the top opening 125 or the bottom opening 135 of the jar 200. The height of the perforated lid 500 can be substantially the same as the length of the top jar neck 120 or the bottom jar neck 130 of the jar 100. The internal diameter of the perforated lid 500 can match the external diameter of the top jar neck 120 or the external diameter of the bottom jar neck 130. The perforated lid 500 can be secured at the top opening 125 or the bottom opening 135 of the jar 100. The size of holes 510 in the perforated lid 500 may selected to allow water penetration or air flow. At the same time, the size of the holes 510 in the perforated lid 500 can be selected to prevent penetration of seeds through the holes.

Figure 5B:
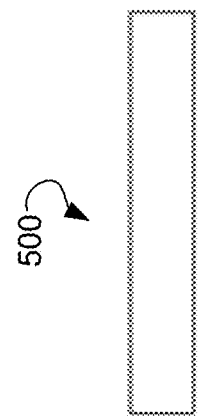
FIG. 5B is a side view of the perforated lid of the FIG. 5A.

FIG. 5B is a side view of the perforated lid of the FIG. 5A.

Figure 6A:
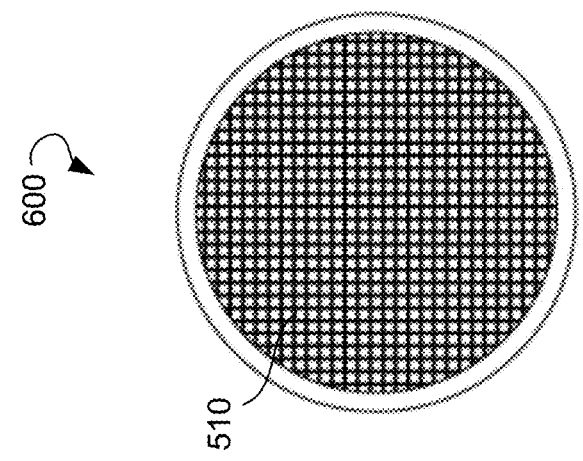
FIG. 6A is a top view of a perforated lid with internal thread, according to an example embodiment.

FIG. 6A is a top view of a perforated lid 600 with internal threads, according to an example embodiment. The perforated lid 600 can be configured to be removably secured at the top opening 125 or the bottom opening 135 of the jar 200. The height of the perforated lid 600 can be substantially the same as the length of the top jar neck 120 or the bottom jar neck 130 of the jar 200. The internal diameter of the perforated lid 600 can match the external diameter of the top jar neck 120 or the external diameter of the bottom jar neck 130 of the jar 200. The perforated lid 600 can be secured at the top opening 125 or the bottom opening 135 of the jar 200. The size of holes 510 in the perforated lid 600 may selected to allow water penetration or air flow. At the same time, the size of the holes 510 in the perforated lid 600 can be selected to prevent penetration of seeds through the holes.

Figure 6B:
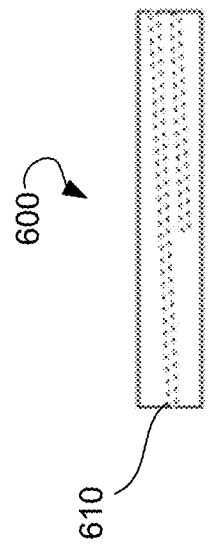
FIG. 6B is a side view of the sealed lid of the FIG. 6A.

FIG. 6B is a side view of the perforated lid of the FIG. 6A. The perforated lid 600 may include internal threads 610. The internal threads 610 may allow threading the perforated lid 600 onto the top jar neck 120 of the jar 200 using the external thread 140. The internal thread 610 can may also allow threading the perforated lid 600 onto the bottom jar neck 130 of the jar 200 using the external thread 150.

FIG. 7A is a side view of a stand 700 for a jar, according to an example embodiment. The stand 700 may include a base 730, a support leg 710, and a support leg 720. The base 730 may include a tray 740 for collecting liquid. The support legs 710 and 720 can be positioned perpendicular to the base 730 and substantially parallel to each other. A distance between the support leg 710 and the support leg 720 may substantially match the external diameter of one of the seal lid 300, the seal lid 400, the perforated lid 500, or the perforated lid 600. At the same time, the distance between the between the support leg 710 and the support leg 720 can be less than external diameter of the body 110 of the jar 100 or the external diameter of the body 110 of the jar 200. The height of the support leg 710 and the support leg 720 can be more than the length of jar necks 120, 130 of the jar 100 or the jar 200 and more than the height of the lids 300, 400, 500, and 600 to allow the air to pass between the tray 740 and the jar necks 120, 130 or between the tray 740 and the lids 300, 400, 500, and 600. Therefore, the stand 700 can support the jar over the tray 740 while keeping a space between the jar 200 and the tray 740.

FIG. 7B is a top view of the stand of FIG. 7A. The base 730 can be made in a square shape with a side length larger than external diameters of the lids 300, 400, 500, and 600. A width of the support leg 710 and the support leg 720 can be less than the side length of the base 730.

FIG. 7C is a side view of a stand 770 for a jar, according to another example embodiment. The stand 770 may include a base 750, a support leg 710, and a support leg 720. The base 730 may include a tray 740 for collecting liquid. The support legs 710 and 720 can be positioned perpendicular to the base 750 and substantially parallel to each other. A distance between the support leg 710 and the support leg 720 may substantially match the external diameter of one of the seal lid 300, the seal lid 400, the perforated lid 500, or the perforated lid 600. At the same time, the distance between the between the support leg 710 and the support leg 720 can be less than external diameter of the body 110 of the jar 100 or the external diameter of the body 110 of the jar 200. The height of the support leg 710 and the support leg 720 can be more than the length of jar necks 120, 130 of the jar 100 or the jar 200 and more than the height of the lids 300, 400, 500, and 600.

FIG. 7D is a top view of the stand of FIG. 7C. The base 730 can be made in a square shape with a side length substantially equal to external diameters of the lids 300, 400, 500, and 600. A width of the support leg 710 and the support leg 720 can be less than the side length of the base 750.

Figure 8:
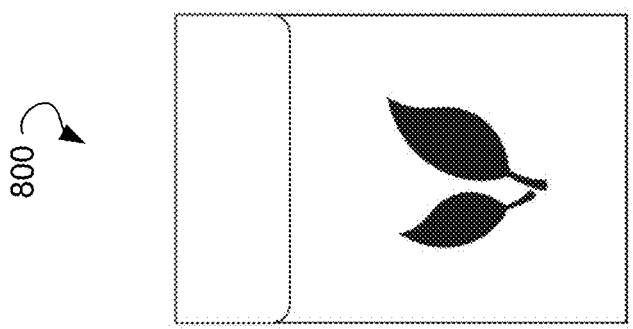
FIG. 8 illustrates an example seed packet.

FIG. 8 illustrates an example seed packet 800. The seed packet 800 may include seeds to be sprouted in the jar 100 or the jar 200. An amount of seeds can be calibrated based on diameter and volume of the jar 100 or diameter and volume of the jar 200 and species of the seeds.

Figure 9:
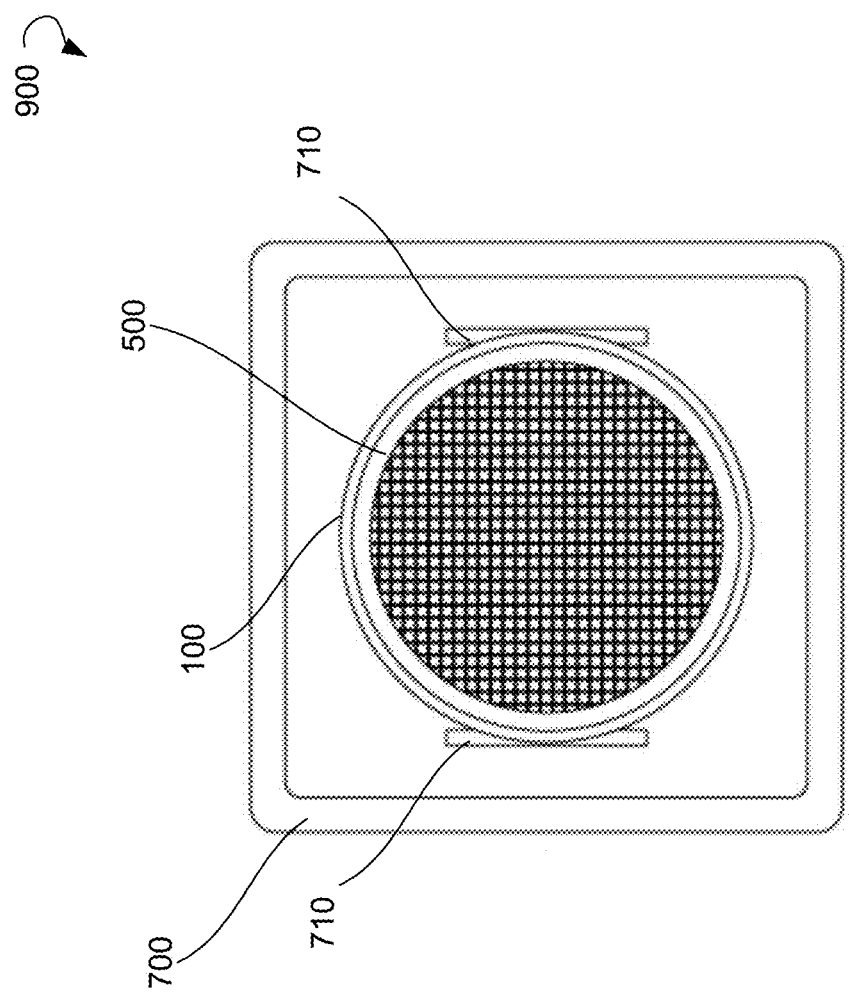
FIG. 9 is a top view of an assembly of a jar, a perforated lid, and a stand for the jar, according to some example embodiments.

FIG. 9 is a top view of an assembly 900 of the jar 100, the perforated lid 500, and the stand 700, according to some example embodiments. The perforated lid 500 is secured at the top opening of the jar 100. A seal lid 300 or another perforated lid 500 (obstructed in the FIG. 9) can be secured at the bottom opening of the jar 100.

Figure 10:
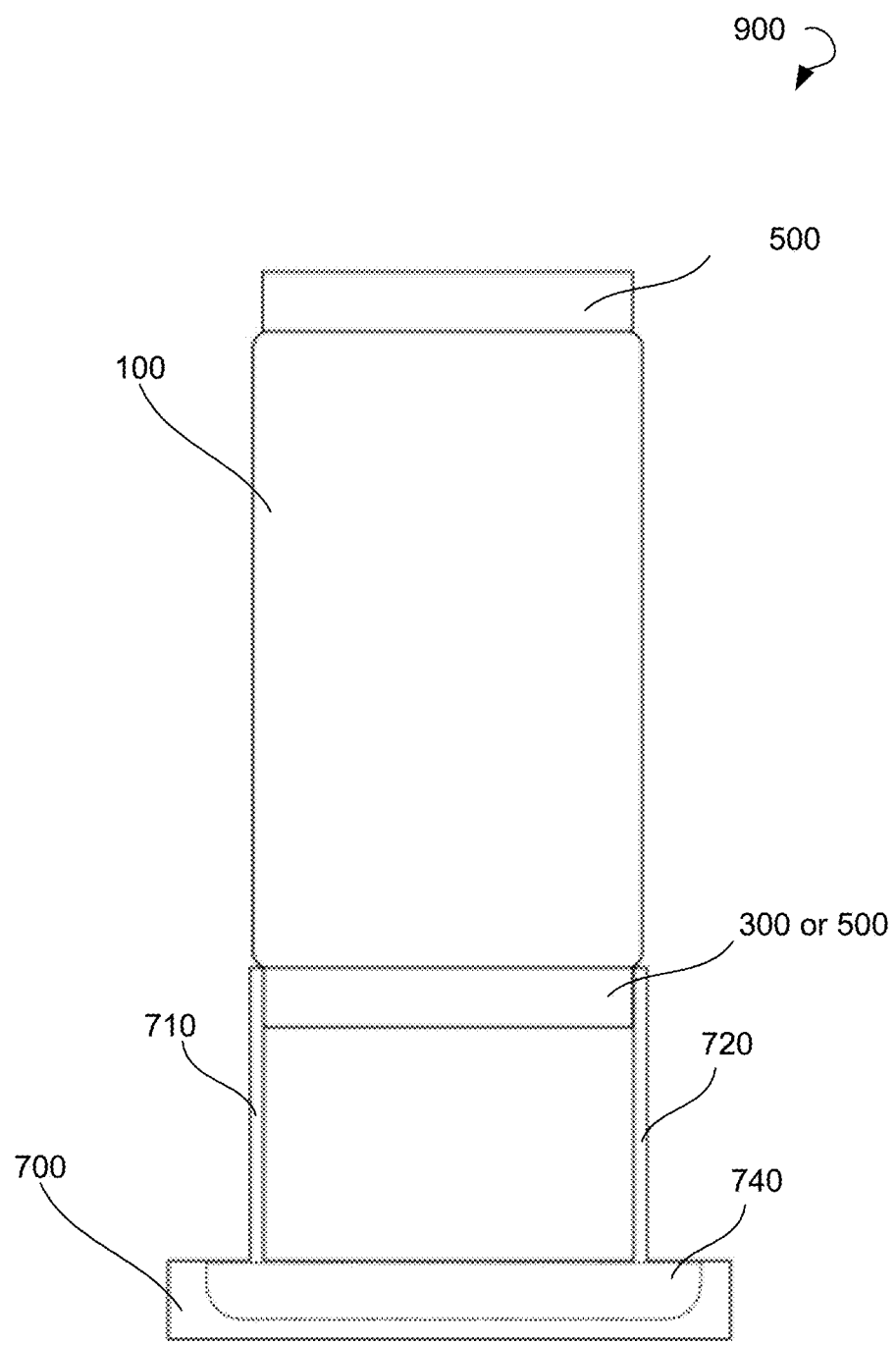
FIG. 10 is a side view of an assembly of a jar, perforated lids or sealed lids, and a stand for the jar, according to some example embodiments.

FIG. 10 is a side view of the assembly 900. The assembly 900 includes the jar 100, the perforated lid 500, the stand 700, and the seal lid 300 or another perforated lid 500. The perforated lid 500 is secured at the top opening of the jar 100. A seal lid 300 or another perforated lid 500 is secured at the bottom opening of the jar 100. The stand 700 includes a tray 740 for collecting liquid that can drain through the perforated lid 500 when the perforated lid 500 is secured at the bottom opening of jar 100.

Figure 11:
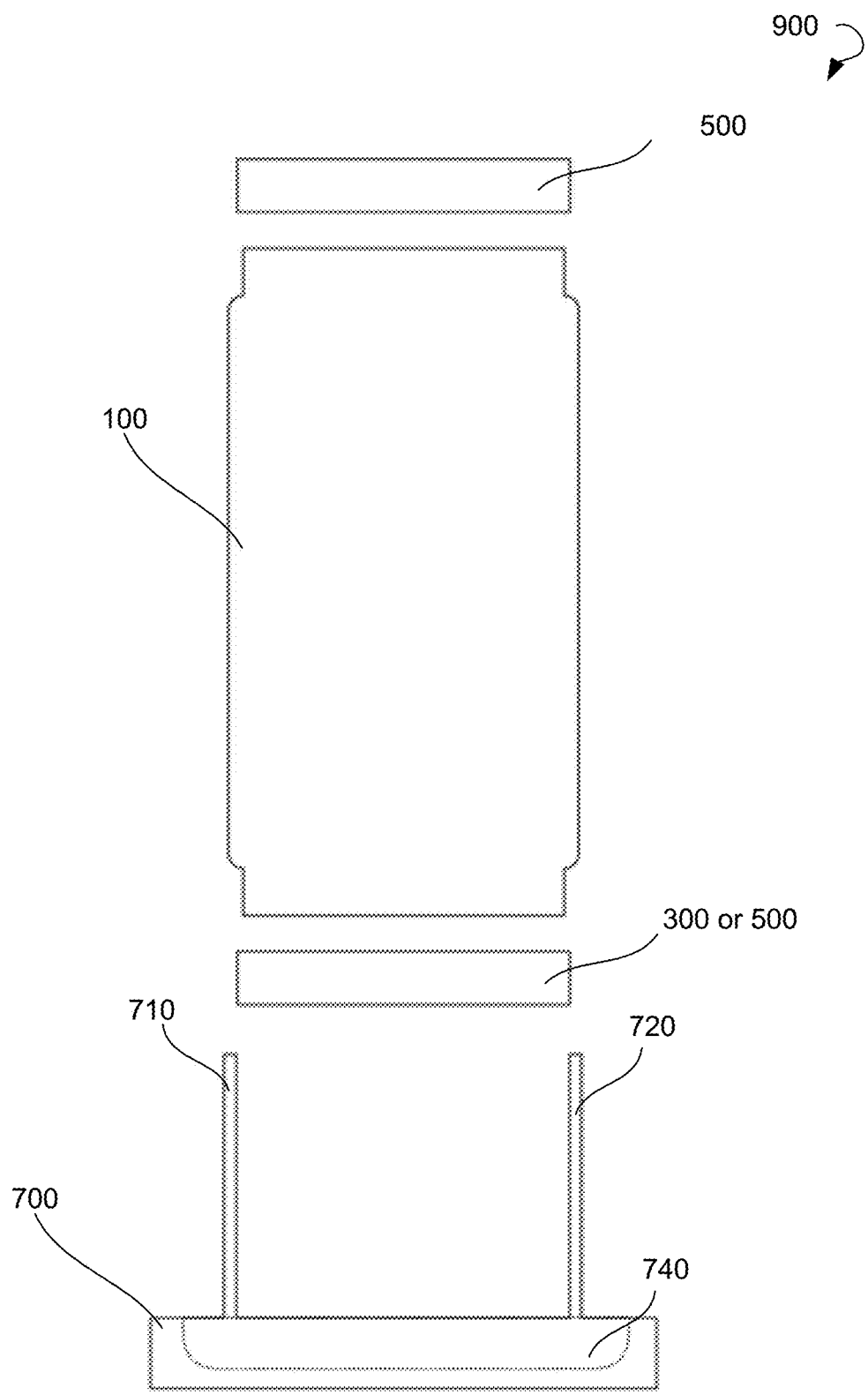
FIG. 11 is an exploded view of an assembly of a jar, perforated lids or sealed lids, and a stand for the jar, according to some example embodiments.

FIG. 11 is an exploded view of the assembly 900. The assembly 900 includes the jar 100, the perforated lid 500, the stand 700, and the seal lid 300 or another perforated lid 500. The perforated lid 500 is secured at the top opening of the jar 100. A seal lid 300 or another perforated lid 500 is secured at the bottom opening of the jar 100. The stand includes a tray 740.

Figure 12:
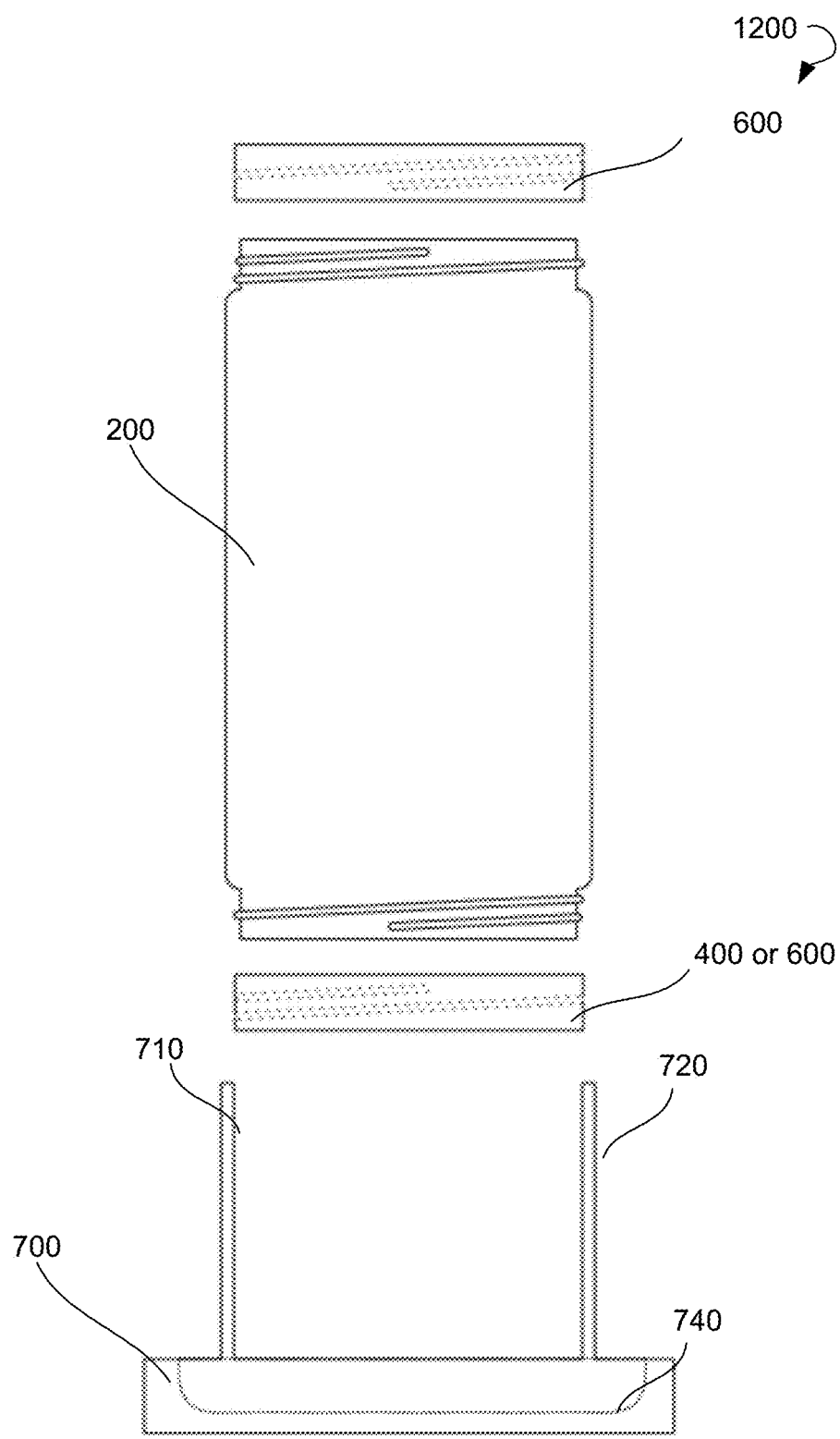
FIG. 12 is an exploded view of an assembly of a jar with external threads, perforated lids with internal threads or sealed lids with external threads, and a stand for the jar, according to some example embodiments.

FIG. 12 is an exploded view of an assembly 1200. The assembly 1200 may include a jar 200 with external threads, a perforated lid 600, a sealed lid 400, and a stand 700. The assembly 1200 may include another perforated lid 600 instead of the seal lid 400. The stand 700 includes a tray 740 for collecting liquid that can drain through the perforated lid 600 when the perforated lid 600 is secured at the bottom opening of jar 200.

FIG. 13A is a top view of an insert holder 1300, according to an example embodiment. The insert holder 1300 may include a side 1310 and a through opening 1320. The insert holder 1300 can be configured to be removably secured at the top opening 125 or the bottom opening 135 of the jar 100. The height of the insert holder 1300 can be substantially the same as the length of the top jar neck 120 or the bottom jar neck 130 of the jar 100. The internal diameter of the insert holder 1300 can match the external diameter of the top jar neck 120 or the external diameter of the bottom jar neck 130.

FIG. 13B is a side view of the insert holder 1300.

FIG. 13C is section view of the insert holder 1300.

FIG. 14A is a top view of an insert holder 1400 with internal threads, according to an example embodiment. The insert holder 1400 may include a side 1410 and a through opening 1420. The insert holder 1400 can be configured to be removably secured at the top opening 125 or the bottom opening 135 of the jar 200. The height of the side 1410 of the insert holder 1400 can be substantially the same as the length of the top jar neck 120 or the bottom jar neck 130. The internal diameter of the insert holder 1400 can match the external diameter of the top jar neck 120 or the external diameter of the bottom jar neck 130. The insert holder 1600 can be screwed at the top opening 125 or the bottom opening 135 of the jar 200.

FIG. 14B is a side view of the insert holder 1400. The insert holder 1400 may include internal threads 410. The internal threads 410 can may allow threading the insert holder 1400 onto the top jar neck 120 of the jar 200 using the external threads 140. The internal threads 410 may also allow threading the insert holder 1400 onto the bottom jar neck 130 of the jar 200 using the external thread 140.

FIG. 14C is section view of the insert holder 1400.

Figure 15A:
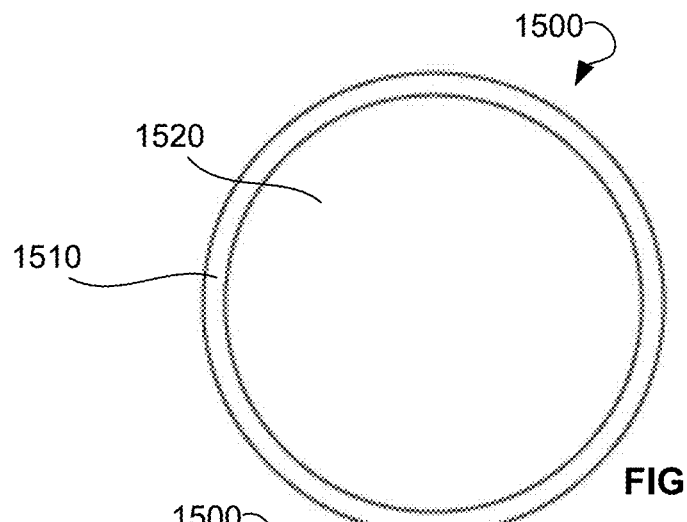
FIG. 15A is a top view of a seal insert, according to an example embodiment.

FIG. 15A is a top view of a seal insert 1500, according to an example embodiment.

Figure 15B:
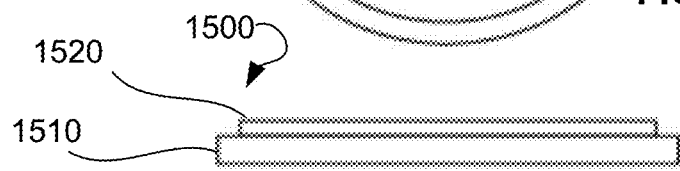
FIG. 15B is a side view of the seal insert of FIG. 15A.

FIG. 15B is a side view of the seal insert 1500 of FIG. 15A. The seal insert 1500 may include a base 1510 and a projection 1520. The diameter of the base 1510 can be substantially equal to the internal diameter of the insert holder 1300 or the internal diameter of the insert holder 1400. The diameter of the projection 1520 can be substantially equal to the diameter of the opening 1320 of the insert holder 1500 or the diameter of the opening 1420 of the insert holder 1400.

Figure 16A:
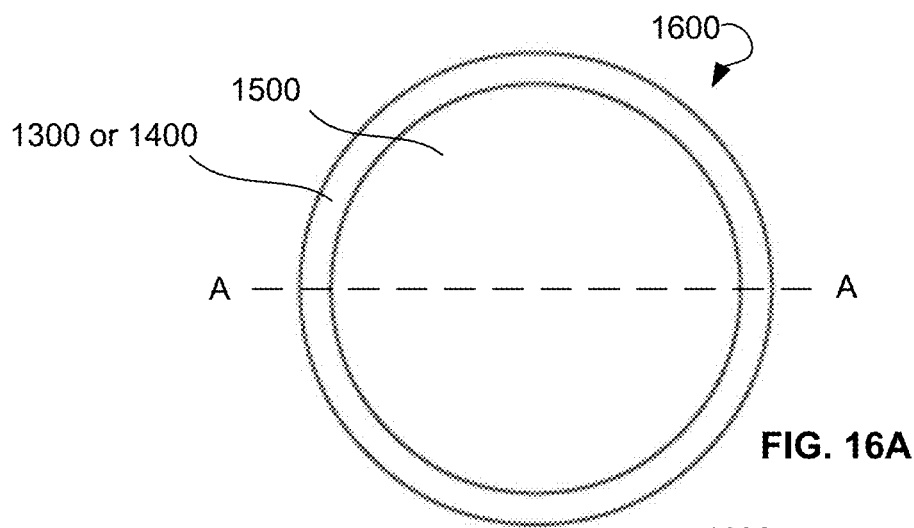
FIG. 16A is top view of an assembly of an insert holder and a seal insert.

FIG. 16A is a top view of an assembly 1600. The assembly 1600 includes the insert holder 1300 or insert holder 1400 and the seal insert 1500.

Figure 16B:
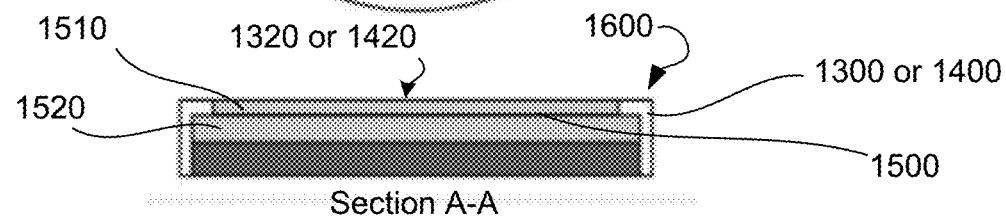
FIG. 16B is the section view of the assembly of FIG. 16A.

FIG. 16B is a section view of the assembly 1600. The projection 1520 fills the space of the through opening 1320 of the insert holder 1300 or the through opening 1420 of the insert holder 1600. The base 1520 fits the space between walls of the insert holder 1300 or the insert holder 1400.

Figure 17A:
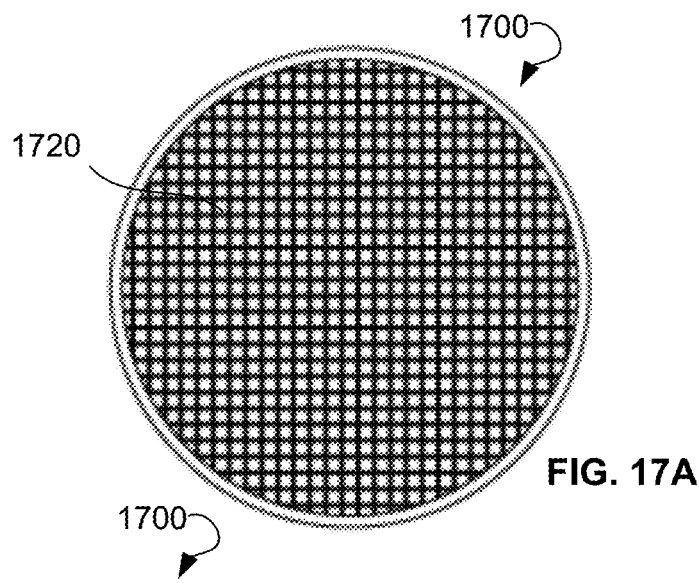
FIG. 17A is a top view of a perforated insert, according to an example embodiment.

FIG. 17A is a top view of a perforated insert 1700. The perforated insert 1700 includes holes 1720. The size of the holes allows penetration of water and air and does not allow penetration of seeds.

Figure 17B:
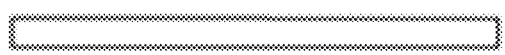
FIG. 17B is a side view of the perforated insert of FIG. 17A.

FIG. 17B is a side view of the perforated insert 1700. The external diameter of the perforated 1710 can be substantially equal to the internal diameter of the insert holder 1300 or the internal diameter of the insert holder 1400.

Figure 18A:
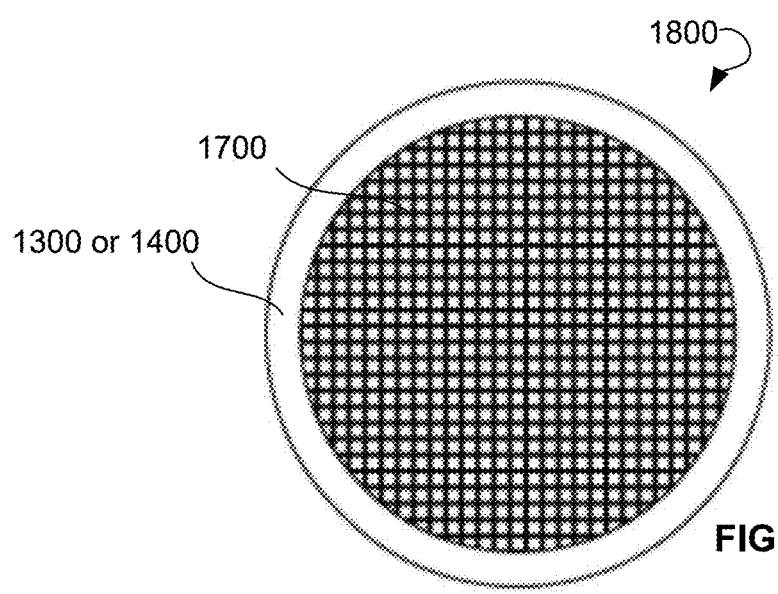
FIG. 18A is top view of an assembly of an insert holder and a perforated insert.

FIG. 18A is a top view of an assembly 1800. The assembly 1800 includes the insert holder 1300 or the insert holder 1400 and the perforated insert 1700.

Figure 18B:
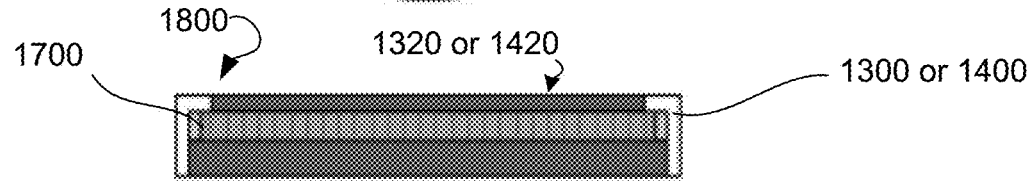
FIG. 18B is the section view of the assembly of FIG. 18A.

FIG. 18B is a section view of the assembly 1800. The perforated insert 1700 fits the space between walls of the insert holder 1300 or the insert holder 1400.

FIG. 19A is a side view of a stand 1900 for a jar, according to another example embodiment. The stand 1900 may include a base 1930, a support leg 710, and a support leg 720. The base 1930 may include a tray 740 for collecting liquid. The support legs 710 and 720 can be positioned perpendicular to the base 1930 and substantially parallel to each other. A distance between the support leg 710 and the support leg 720 may substantially match the external diameter of one of the seal lid 300, the seal lid 400, the perforated lid 500, the perforated lid 600, the insert holder 1300, or the insert holder 1400. At the same time, the distance between the between the support leg 710 and the support leg 720 can be less than external diameter of the body 110 of the jar 100 or the external diameter of the body 110 of the jar 200. The height of the support leg 710 and the support leg 720 can be more than the length of jar necks 120, 130 of the jar 100 or the jar 200 and more than the height of the lids 300, 400, 500, and 600.

FIG. 19B is a top view of the stand 1900 of FIG. 19A. The base 1930 can be made in a shape of a disk with a diameter larger than external diameters of the lids 300, 400, 500, and 600, and the insert holders 1300 and 1400. A width of the support leg 710 and the support leg 720 can be less than the diameter of the base 1930.

FIG. 19C is a side view of a stand 1970 for a jar, according to another example embodiment. The stand 1970 may include a base 1950, a support leg 710, and a support leg 720. The base 1930 may include a tray 740 for collecting liquid from the jar. The support legs 710 and 720 can be positioned perpendicular to the base 1950 and substantially parallel to each other. A distance between the support leg 710 and the support leg 720 may substantially match the external diameter of one of the seal lid 300, the seal lid 400, the perforated lid 500, the perforated lid 600, the insert holder 1300, or the insert holder 1400. At the same time, the distance between the between the support leg 710 and the support leg 720 can be less than external diameter of the body 110 of the jar 100 or the external diameter of the body 110 of the jar 200. The height of the support leg 710 and the support leg 720 can be more than the length of jar necks 120, 130 of the jar 100 or the jar 200 and more than the height of the lids 300, 400, 500, and 600 and the insert holders 1300 and 1400.

FIG. 19D is a top view of the stand 1970 of FIG. 19C. The base 1950 can be made in a disk shape. A width of the support leg 710 and the support leg 720 can be less than the diameter of the base 1950. Diameter of the disk shape can be substantially equal to a distance between an external side of the support leg 710 and an external side of the support leg 720.

Figure 20B:
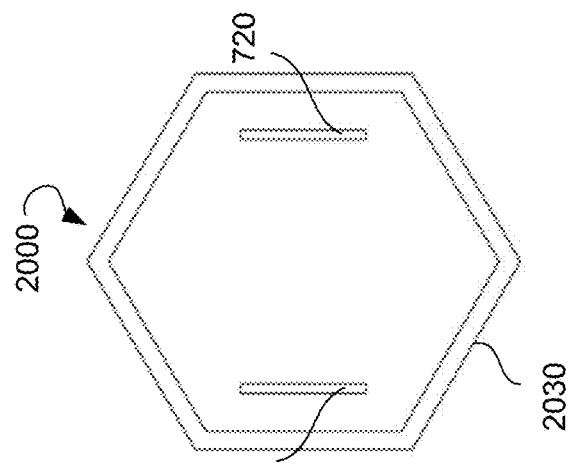
FIG. 20B is a top view of the stand of FIG. 20A.
Figure 20A:
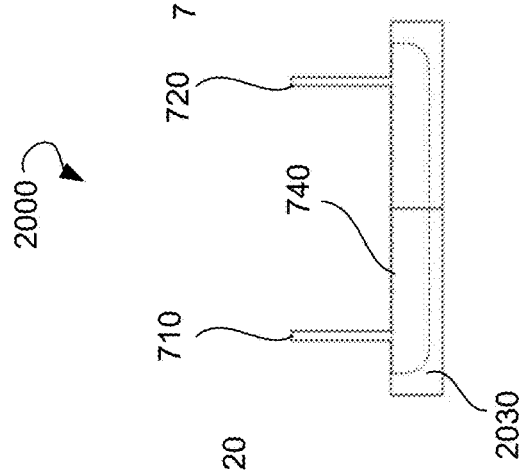
FIG. 20A is a side view of a stand for a jar, according to an example embodiment.

FIG. 20A is a side view of a stand 2000 for a jar, according to another example embodiment. The stand 2000 may include a base 2030, a support leg 710, and a support leg 720. The base 2030 may include a tray 740 for collecting liquid. The support legs 710 and 720 can be positioned perpendicular to the base 2030 and substantially parallel to each other. A distance between the support leg 710 and the support leg 720 may substantially match the external diameter of one of the seal lid 300, the seal lid 400, the perforated lid 500, the perforated lid 600, the insert holder 1300, or the insert holder 1400. At the same time, the distance between the between the support leg 710 and the support leg 720 can be less than external diameter of the body 110 of the jar 100 or the external diameter of the body 110 of the jar 200. The height of the support leg 710 and the support leg 720 can be more than the length of jar necks 120, 130 of the jar 100 or the jar 200 and more than the height of the lids 300, 400, 500, and 600.

FIG. 20B is a top view of the stand 2000 of FIG. 20A. The base 2030 can be made in a shape of hexagon. The diameter of inscribed circle of the hexagon can be larger than the external diameters of the lids 300, 400, 500, and 600, and the insert holders 1300 and 1400. A width of the support leg 710 and the support leg 720 can be less than the diameter of diameter of inscribed circle the base 2030.

Figure 20D:
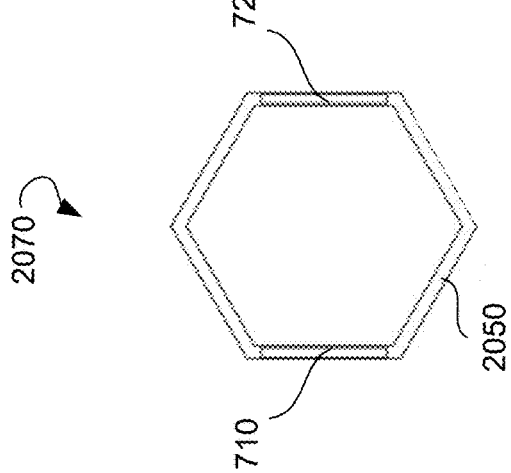
FIG. 20D is a top view of the stand of FIG. 20C.
Figure 20C:
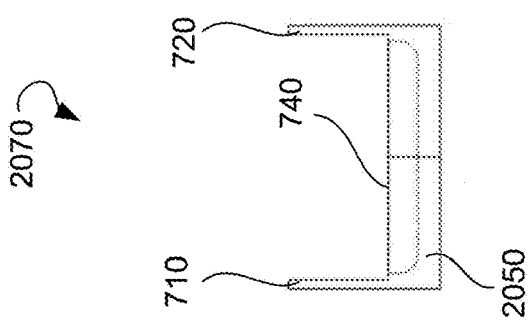
FIG. 20C is a side view of a stand a jar, according to an example embodiment.

FIG. 20C is a side view of a stand 2070 for a jar, according to another example embodiment. The stand 2070 may include a base 2050, a support leg 710, and a support leg 720. The base 2030 may include a tray 740 for collecting liquid. The support legs 710 and 720 can be positioned perpendicular to the base 2150 and substantially parallel to each other. A distance between the support leg 710 and the support leg 720 may substantially match the external diameter of one of the seal lid 300, the seal lid 400, the perforated lid 500, the perforated lid 600, the insert holder 1300, or the insert holder 1400. At the same time, the distance between the between the support leg 710 and the support leg 720 can be less than external diameter of the body 110 of the jar 100 or the external diameter of the body 110 of the jar 200. The height of the support leg 710 and the support leg 720 can be more than the length of jar necks 120, 130 of the jar 100 or the jar 200 and more than the height of the lids 300, 400, 500, and 600 and the insert holder 1300 and 1400.

FIG. 20D is a top view of the stand 2070 of FIG. 22C. The base 2050 can be made in a shape of hexagon. A width of the support leg 710 and the support leg 720 can be less than the diameter of inscribed circle of the base 2050. The diameter of inscribed circle of the hexagon can be substantially equal to a distance between an external side of the support leg 710 and an external side of the support leg 720.

FIG. 21A is an exploded view of an assembly 2110 for seed sprouting, according to an example embodiment. The assembly 2110 includes a first insert holder 1300, a first seal insert 1500, a jar 100, a second seal insert 1500, and a second insert holder 1300.

FIG. 21B is an exploded view of an assembly 2120 for seed sprouting, according to an example embodiment. The assembly 2120 includes a first insert holder 1300, a perforated insert 1700, a jar 100, a seal insert 1500, and a second insert holder 1300.

FIG. 21C is an exploded view of an assembly 2130 for seed sprouting, according to an example embodiment. The assembly 2130 includes a first insert holder 1300, a first perforated insert 1700, a jar 100, a second perforated insert 1700, and a second insert holder 1300.

Figure 22:
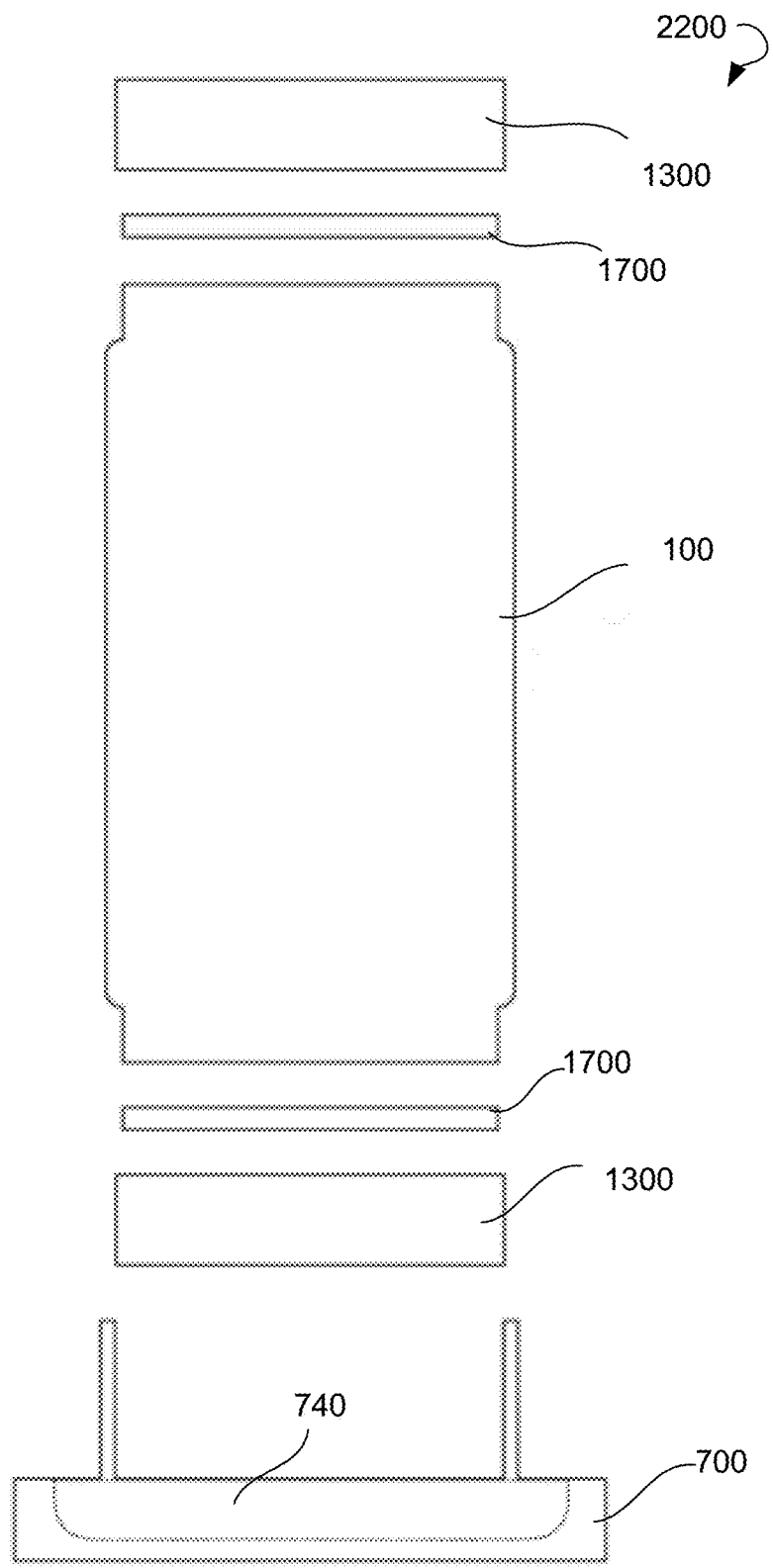
FIG. 22 is an exploded view of an assembly for seed sprouting, according to an example embodiment.

FIG. 22 is an exploded view of an assembly 2200 for seed sprouting, according to example embodiment. The assembly 2200 includes a first insert holder 1300, a first perforated insert 1700, a jar 100, a second perforated insert 1700, a second insert holder 1300, and a stand 700 for the jar 100. The stand 700 includes tray 740 for collecting liquid from the jar 100.

In some embodiments, any of the lids 300, 400, 500, 600, inset holders 1300 and 1400 can be integrated into a single integrated unit with any of the stands 700, 770, 1900, 1970, 2000, and 2070 with removed support legs 710 and 720. The integrated unit can be removably secured to either end of a jar 100 or a jar 200. A tray for collecting liquid from the jar 100 or a jar 200 may also be integrated into the assembly as well. In other words, the stand, tray, and any of the seal lid, perforated lid, and further perforated lid may be integrated into a single integrated unit. Specifically, the stand, tray, and any of the seal lid, perforated lid, and further perforated lid may be manufactured as a single-piece assembly or carried out as a kit of separate pieces of the assembly.

Figure 23:
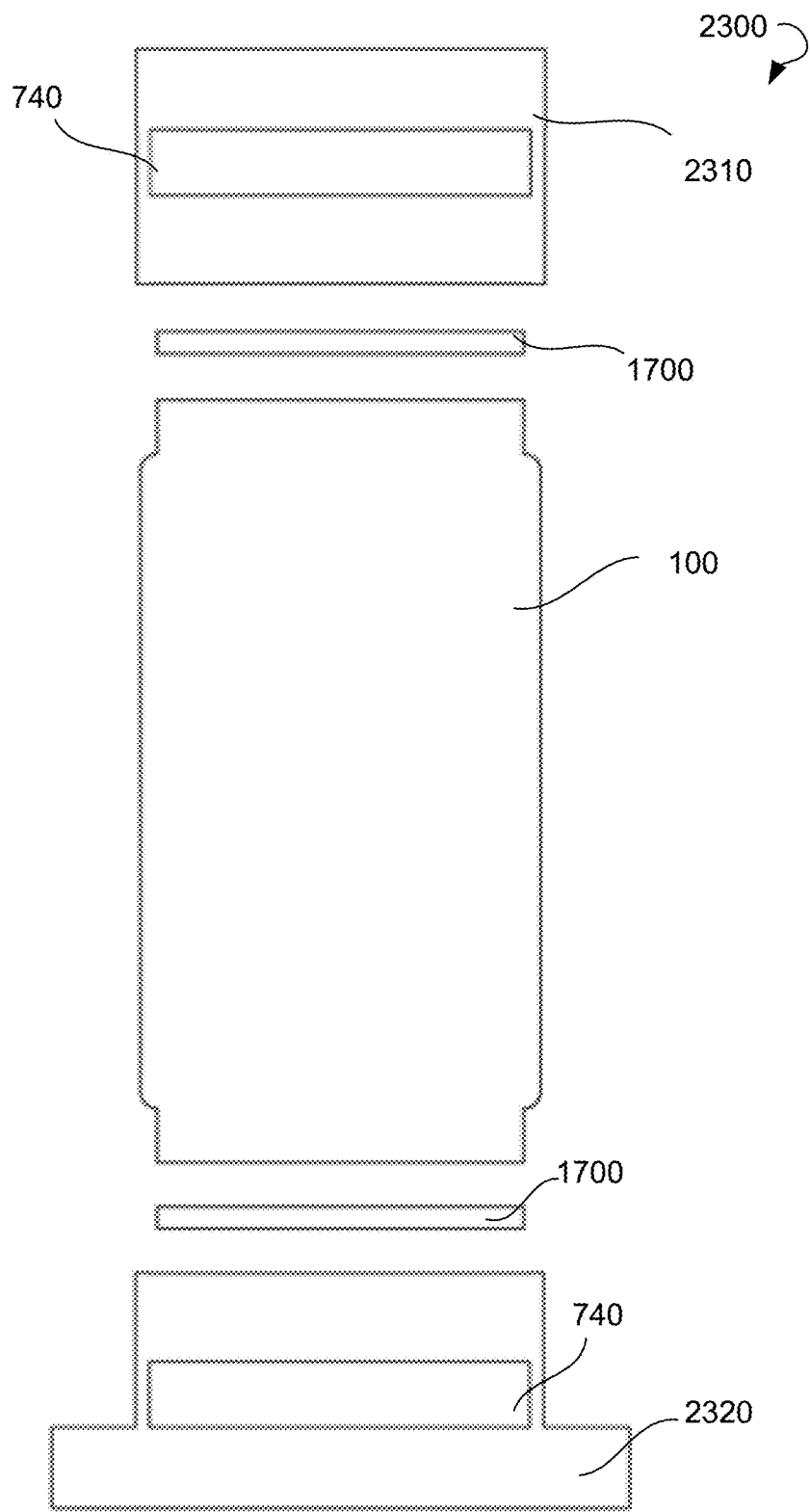
FIG. 23 is an exploded view of an assembly for seed sprouting, according to an example embodiment.

FIG. 23 is an exploded view of an assembly 2300 for seed sprouting, according to an example embodiment. The assembly 2300 includes a first integrated unit 2310, a first perforated insert 1700, a jar 100, a second perforated insert 1700, and a second integrated unit 2320. The first integrated unit 2310 is an integration of an insert holder 1300 and a stand 1970 (shown in FIG. 19C and FIG. 19D) without support legs 710 and 720. The second integrated unit 2320 is integration of an insert holder 1300 and a stand 1900 (shown in FIG. 19A and FIG. 19B) without support legs 710 and 720. Both the first integrated unit 2310 and the second integrated unit 2320 may include a tray 740 for collecting liquid from the jar 100.

Figure 24C:
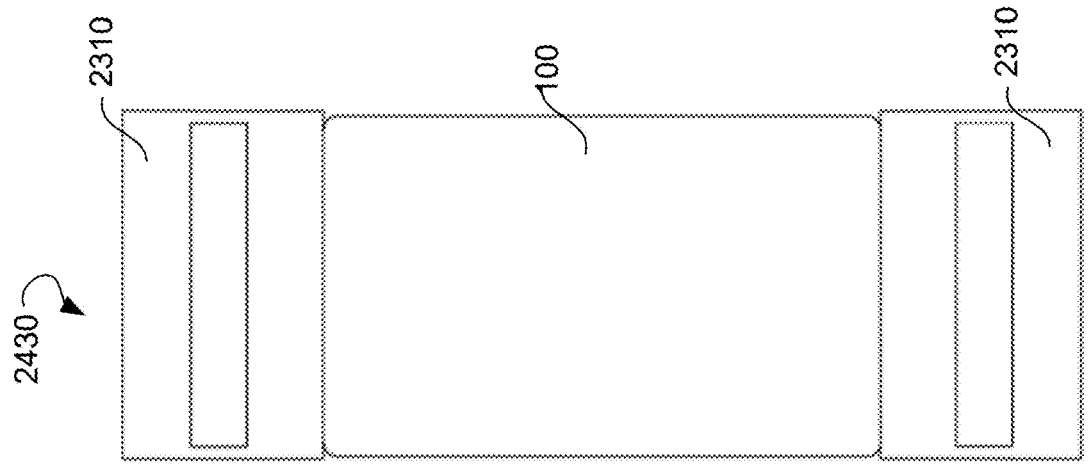
FIG. 24C is a view of an assembly for seed sprouting, according to an example embodiment.
Figure 24B:
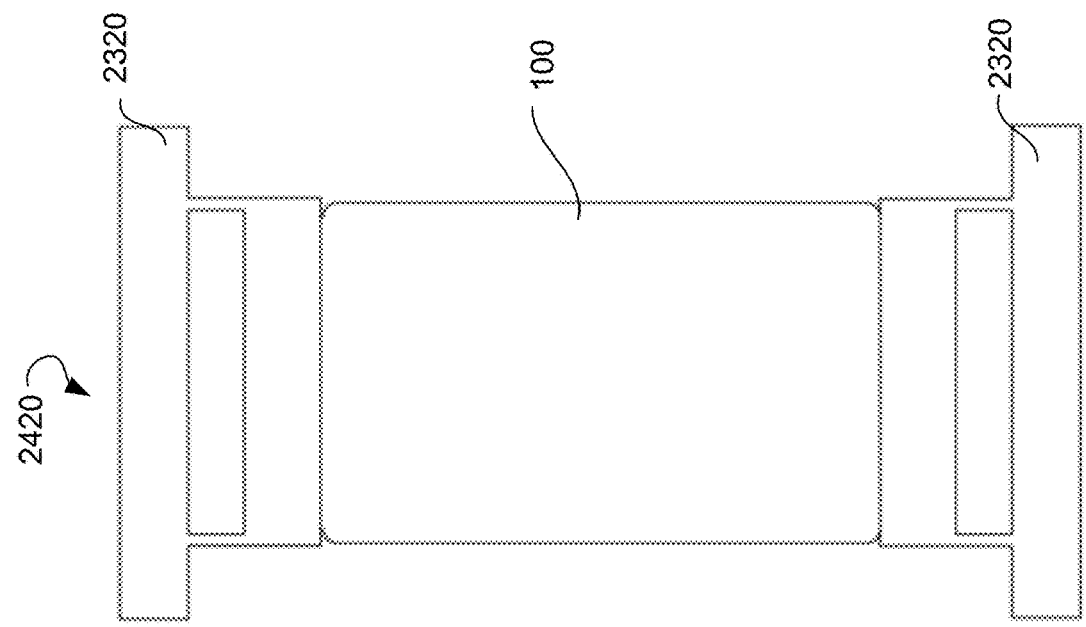
FIG. 24B is a view of an assembly for seed sprouting, according to an example embodiment.
Figure 24A:
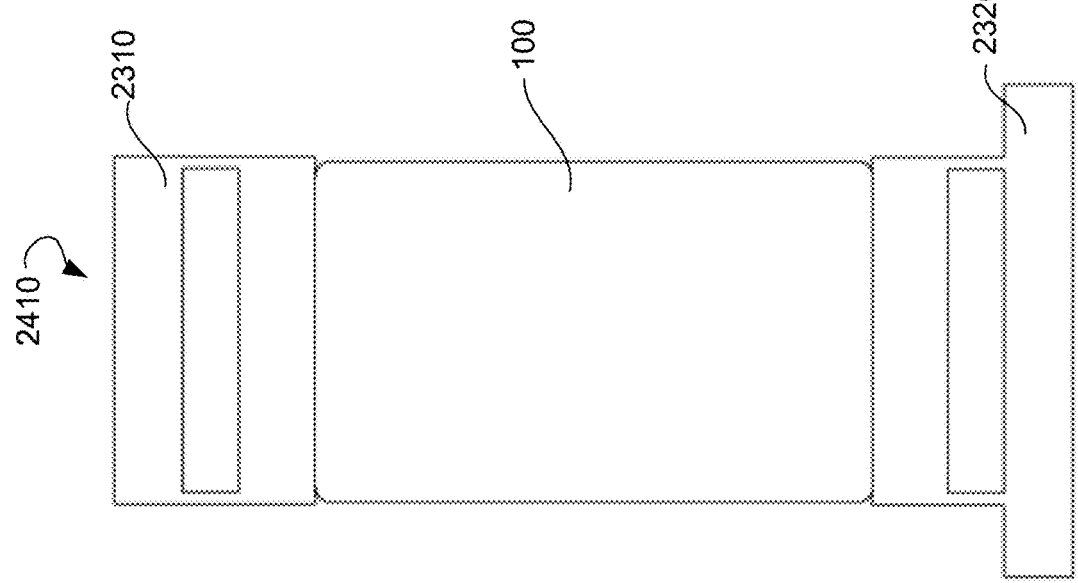
FIG. 24A is a view of an assembly for seed sprouting, according to an example embodiment.

FIG. 24A is a view of an assembly 2410 for seed sprouting, according to an example embodiment. The assembly 2410 includes a first integrated unit 2310, a first perforated insert 1700 or a first seal insert 1500 (obscured), a jar 100, a second perforated insert 1700 or a second seal insert 1500 (obscured), and a second integrated unit 2320.

FIG. 24B is a view of an assembly 2420 for seed sprouting, according to an example embodiment. The assembly 2410 includes a first integrated unit 2320, a first perforated insert 1700 or a first seal insert 1500 (obscured), a jar 100, a second perforated insert 1700 or a second seal insert 1500 (obscured), and a second integrated unit 2320.

FIG. 24C is a view of an assembly 2430 for seed sprouting, according to an example embodiment. The assembly 2410 includes a first integrated unit 2310, a first perforated insert 1700 or a first seal insert 1500 (obscured), a jar 100, a second perforated insert 1700 or a second seal insert 1500 (obscured), and a second integrated unit 2310.

Figure 25:
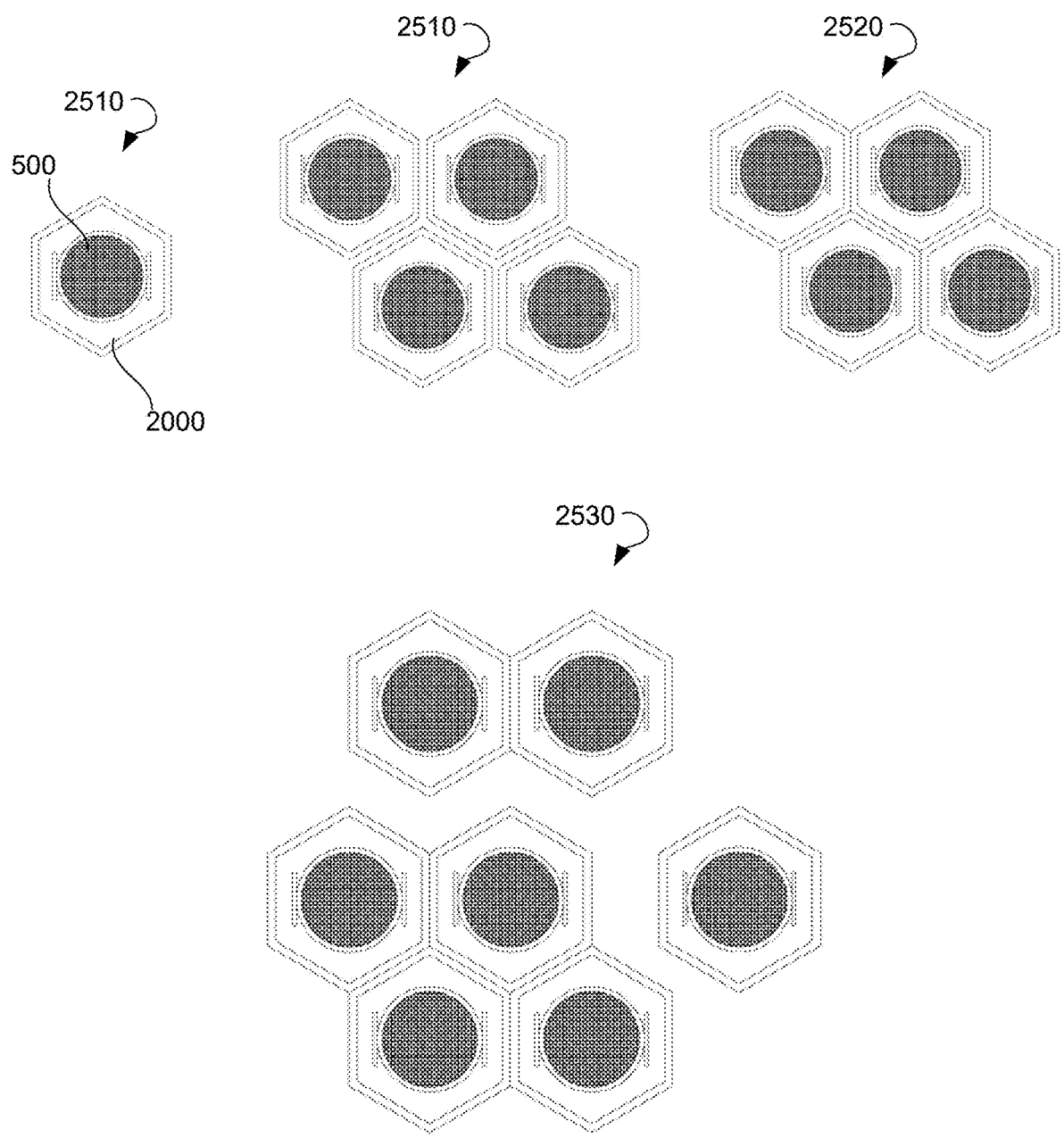
FIG. 25 is top view of an assembly for seed sprouting and hexagon farms for seed sprouting, according to some example embodiments.

FIG. 25 is top view of an assembly 2510 for seed sprouting and hexagon farms 2520, 2530, and 2540 for seed sprouting, according to some example embodiments. The assembly 2510 may include a jar 100 (obscured in FIG. 25), a perforated lid 500 attached to the top opening of the jar 500, another perforated lid 500 or a seal lead 300 (obscured in FIG. 25) attached to the bottom opening of the jar 100, and the hexagon stand 2000. The farm 2520 includes four assemblies 2510 separated from each other. The farm 2530 may include four assemblies 2510 attached to each other by sides of the hexagon stands using one of a snap, screw, twist, suction, magnet, or other fastening means or securing mechanism. The farm 2540 includes seven assemblies 2510. Some of the assemblies 2510 in the farm 2540 can be attached to each other by sides of the hexagon stands.

Figure 26:
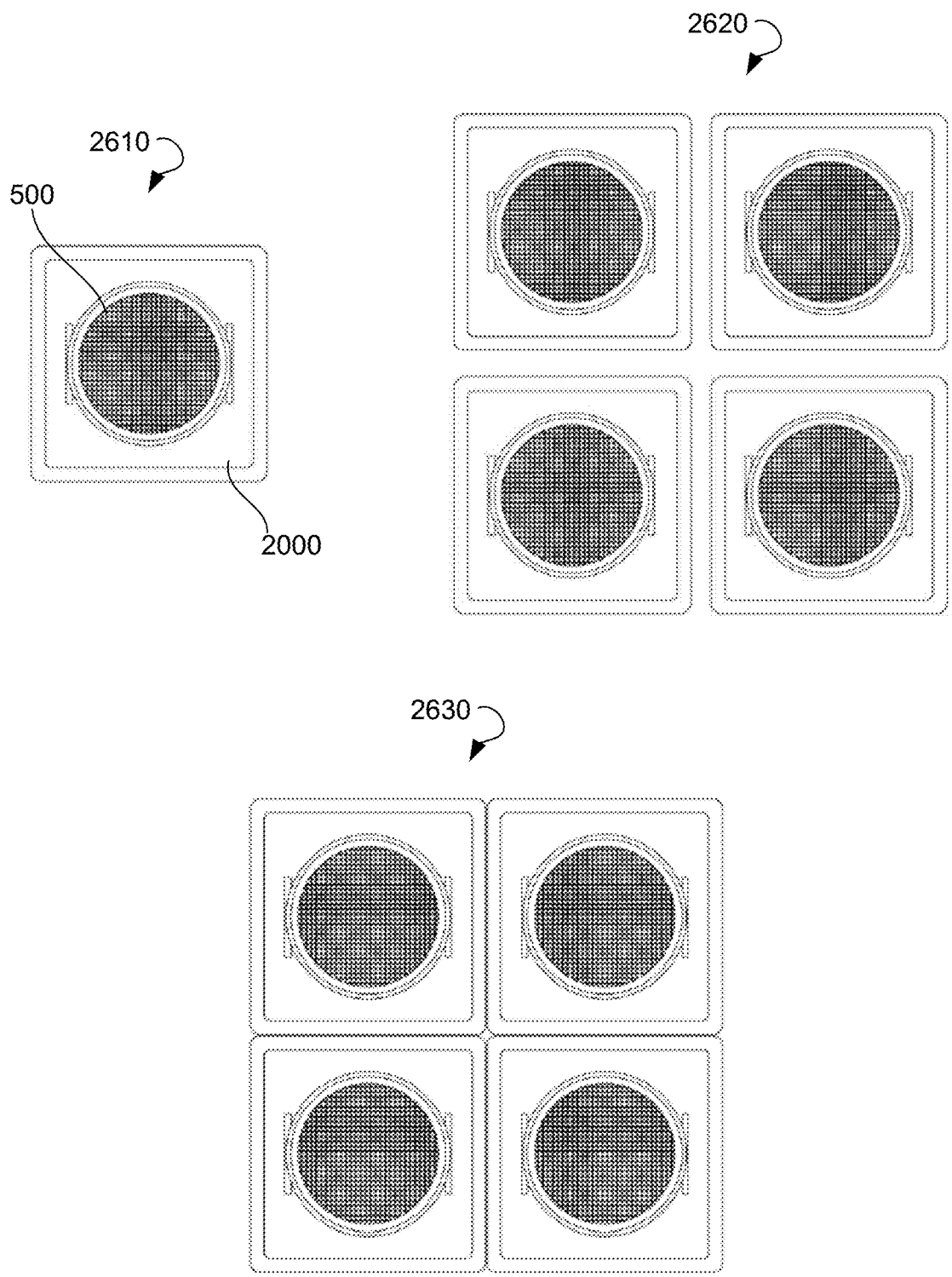
FIG. 26 is top view of an assembly for seed sprouting and square farms for seed sprouting, according to some example embodiments.

FIG. 26 is top view of an assembly 2610 for seed sprouting and square farms 2620, and 2630 for seed sprouting, according to some example embodiments. The assembly 2610 may include a jar 100 (obscured in FIG. 26), a perforated lid 500 attached to the top opening of the jar 500, another perforated lid 500 or a seal lead 300 (obscured in FIG. 26) attached to the bottom opening of the jar 100, and a square stand 700. The farm 2620 includes four assemblies 2610 separated from each other. The farm 2630 may include four assemblies 2510 attached to each other by sides of the square stands using one of a snap, screw, twist, suction, magnet, or other fastening means or securing mechanism. The farm 2540 includes seven assemblies 2510. The assemblies 2510 in the farm 2540 can be attached to each other by hexagon stands.

Figure 27:
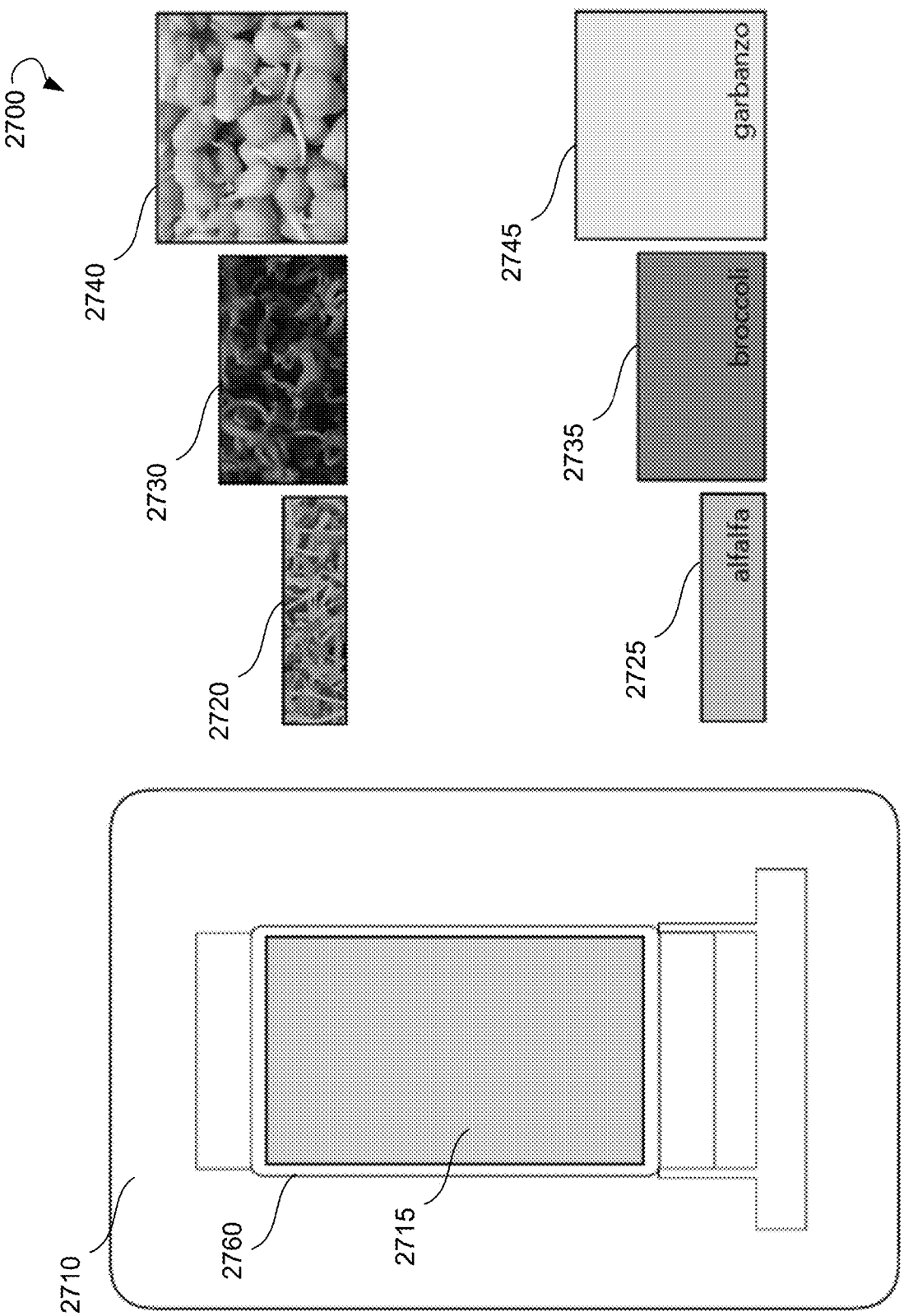
FIG. 27 is a block diagram showing a card-based sprouting management system, according to an example embodiment.

FIG. 27 is a block diagram showing a sprouting management system 2700, according to an example embodiment. The system 2700 may be card-based and may include two-dimensional (2D) cards 2710, 2720, 2730, 2740, 2725, 2735, and 2745. In an example embodiment, the 2D cards 2710, 2720, 2730, 2740, 2725, 2735, and 2745 may be made of paper, plastic, plastic films, and any other suitable materials in form of a paper sheet, a plastic sheet, a pamphlet, and so forth. The system 2700 can be associated with a sprouting kit. The sprouting kit may include a jar with two opening, seal lids, perforated lids, and stand for the jar. The sprouting kit may further include one or more seed packets.

The 2D card 2710 may include a representation of the sprouting kit with a jar. An area in the middle of representation of the sprouting represents a "sprouting area" 2715 of the jar in which the seeds can sprout.

Each of 2D cards 2720, 2730, 2740, 2725, 2735, and 2745 may be associated with one of the species of the seeds provided in appropriate amount in seed packets. The size of each 2D cards may represent the volume the seeds will occupy inside the jar when they sprout. For example, if the full capacity of the jar is 100%, and one packet of garbanzo beans would occupy 60% of the jar when sprouted, then the garbanzo bean sprout card 2740 would be 60% of the "sprouting area" 2715 depicted in the card 2710. Similarly, if one packet of alfalfa sprouts would occupy 20% of the jar when sprouted, then the alfalfa sprout card 2720 would be 20% of the "sprouting area" 2715.

While filling in the jar, a user of the sprouting kit can keep track of the available capacity by placing the respective 2D sprout card in the "sprouting area" on the 2D card 2710 depicting the sprouting kit.

Figure 28:
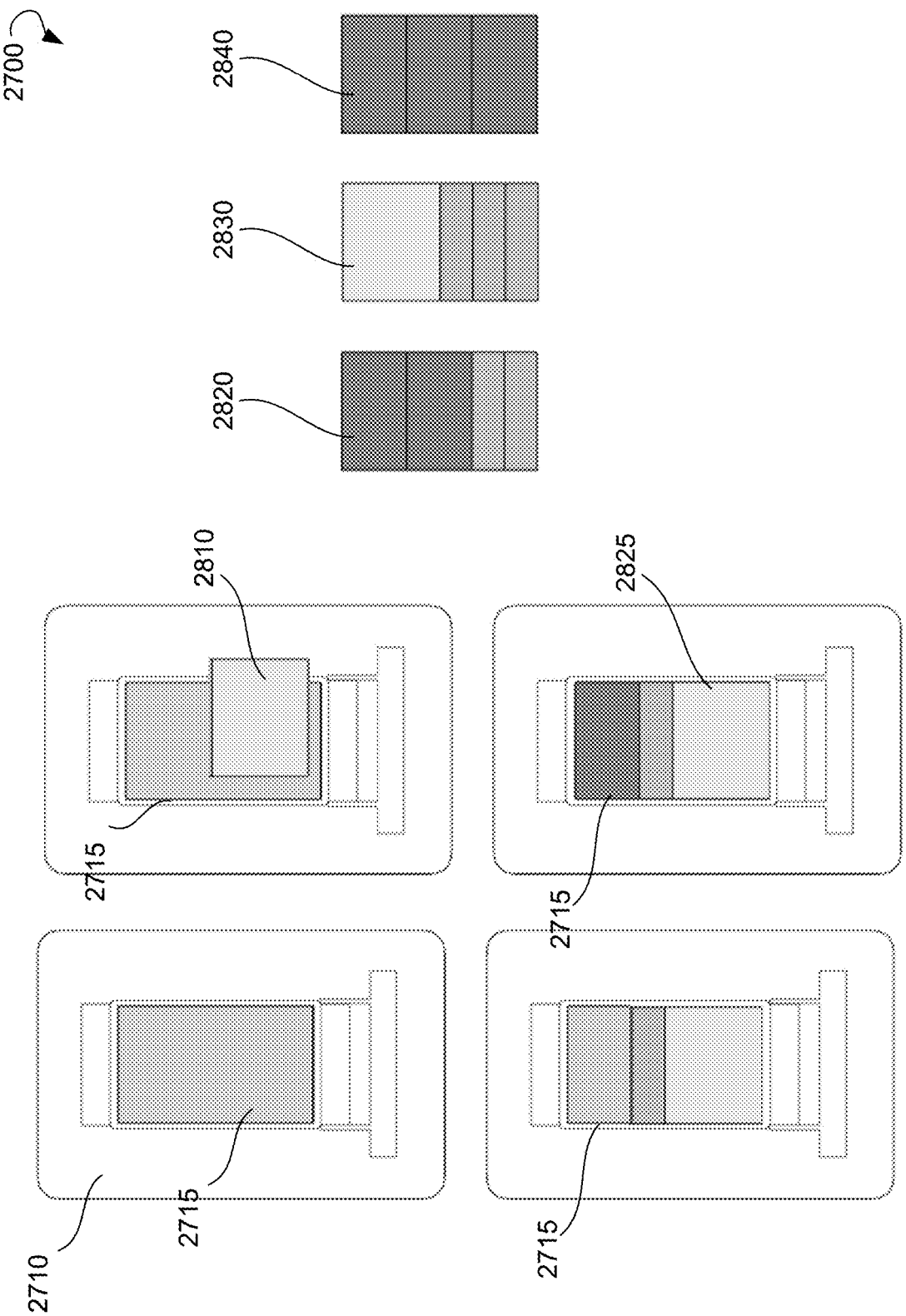
FIG. 28 is a block diagram showing a 2D card with the representation of sprouting kit and "sprouting area" of the sprouting kit.

FIG. 28 is a block diagram showing the 2D cards 2710 with the representation of sprouting kit and "sprouting area" 2715. A user of the sprouting kit associated with the 2D card 2710 can place the 2D card 2810 into the "sprouting area" 2715 to determine size of spouts to be grown from the seeds that correspond to the 2D card 2810. The 2D card 2810 correspond to amount of seed species placed in one of the seed packets supplied with the sprouting kit. The user may also place combination 2725, 2820, 2830, and 2840 of the 2D cards into the "sprouting area" 2715 to determine size of sprouts to be grown from the multiple seed species that provided in multiple seed packets with the sprouting kit.

Figure 29:
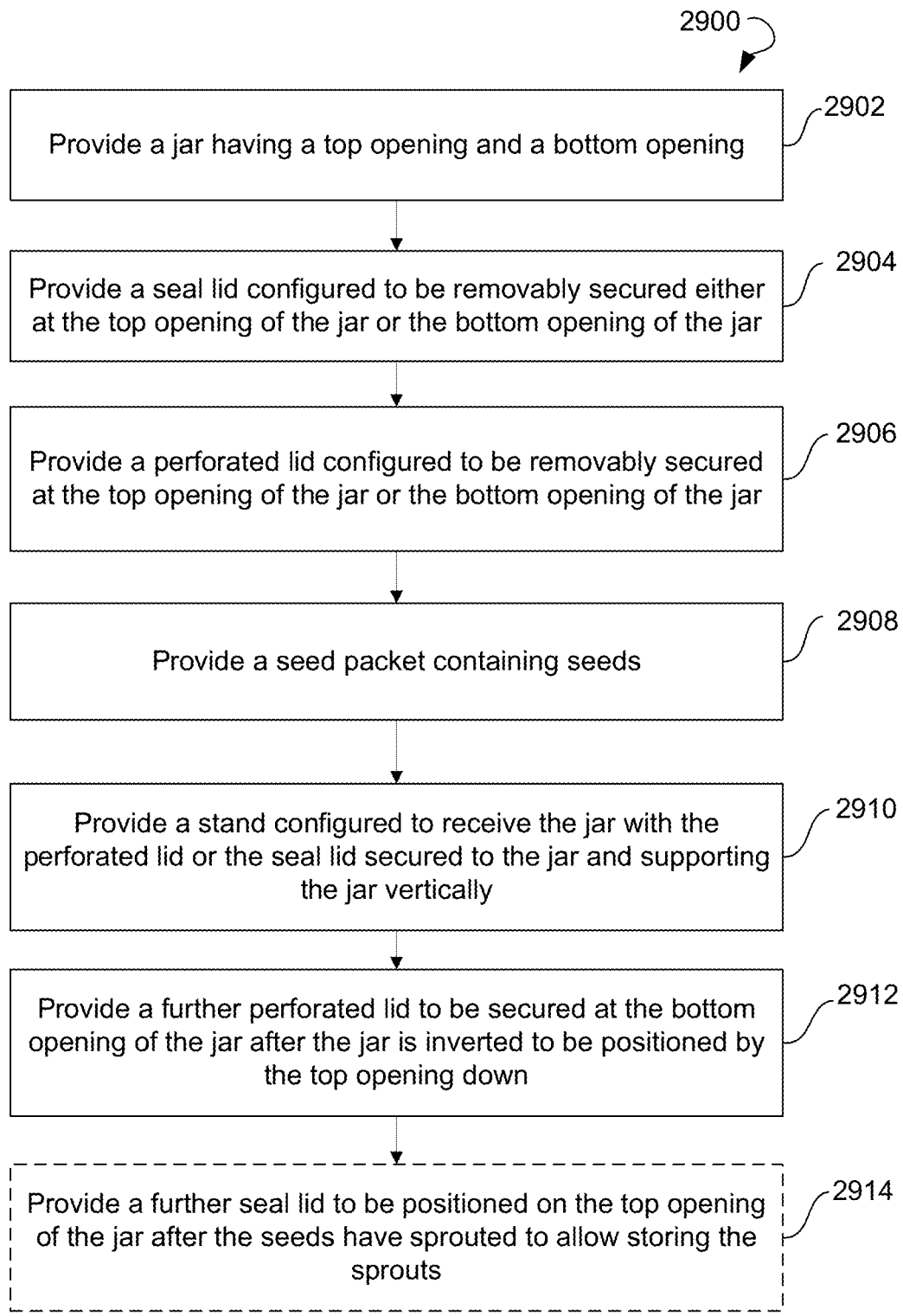
FIG. 29 is a flow chart showing a method for seed sprouting, according to some example embodiments.

FIG. 29 is a flow chart showing a method 2900 for seed sprouting, according to some example embodiments. In some embodiments, the operations of method 2900 may be combined, performed in parallel, or performed in a different order. The method 2900 may also include additional or fewer operations than those illustrated.

The method 2900 may commence in block 2902 with providing a jar having a top opening and a bottom opening.

In block 2904, the method 2900 may include providing a seal lid configured to be removably secured either at the top opening of the jar or the bottom opening of the jar. In certain embodiment, the method 2900 may include providing an inset holder and a seal insert to be removably secured at the top opening of the jar or the bottom opening of the jar.

In block 2906, the method 2900 may include providing a perforated lid configured to be removably secured at the top opening of the jar or the bottom opening of the jar. In some embodiments, the method 2900 may include providing an insert holder and a perforated lid to be removably secured at the top opening of the jar or the bottom opening of the jar.

In block 2908, the method 2900 may include providing a seed packet containing seeds. A quantity of the seeds can be calibrated based on a volume of the jar and species of the seeds. The seeds can be placed into the jar and moistened with a pre-determined amount of water after the seal lid is secured at the bottom opening of the jar and the jar is positioned vertically with the top opening up. The perforated lid can be secured at the top opening of the jar. The perforated lid may include one or more holes to allow draining of the water and preventing penetration of the moistened seeds after the perforated lid is secured at the top opening of the jar and the jar is inverted to be positioned with the top opening down. In some embodiment an assembly of an insert holder and a perforated insert can be used instead of the perforated lid.

In block 2910, the method 2900 may include providing a stand configured to receive the jar with the perforated lid secured to the jar and support the jar vertically. The stand includes a tray for collecting the water drained from the jar. In some embodiments the stand can be integrated with the perforated lid or the insert holder.

In block 2912, the method 2900 may include providing a further perforated lid to be secured at the bottom opening of the jar after the jar is inverted to be positioned with the top opening down and the seal lid removed from the bottom opening of the jar. The perforated lid can be secured to the bottom opening to allow air to flow through the jar. In some embodiments, an assembly of the further insert holder and a further perforated lid can be used instead of the further perforated lid.

In optional block 2914, the method 2900 may include providing a further seal lid to be positioned on the top opening of the jar after the seeds have sprouted to allow storing the sprouts. In some embodiments, an assembly of a further insert holder and a seal insert can be used instead of the further seal lid.

Figure 30:
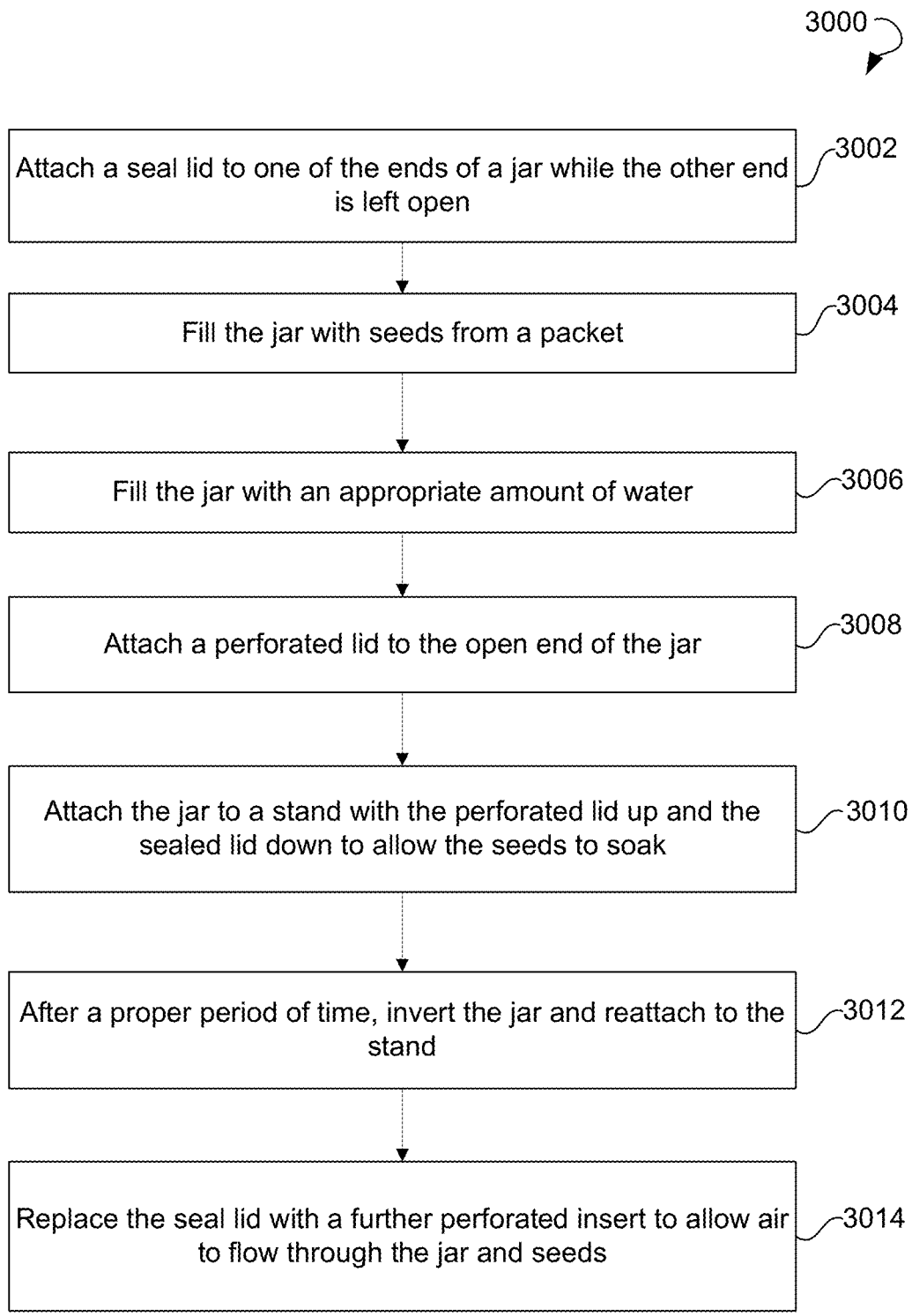
FIG. 30 is a flow chart showing a method 3000 for seed sprouting, according to some example embodiments.

FIG. 30 is a flow chart showing a method 3000 for seed sprouting, according to some example embodiments. The method 3000 can be performed using a system for seed sprouting. An example system may include a jar 100 with an opening at each end. The jar 100 can be made of any suitable material that allows for proper plant growth (preferably glass). The system may further include two types of lids that fit the jar (for example, one or more sealed lids 300 and one or more perforated lids 500). The lids may be snapped on, screwed on, or otherwise securely affixed to the jar 100. The system may include a stand 700 with a tray 740. The stand 700 can be attached securely to the perforated lid 500 in order to position the jar 100 so the jar can drain after the seeds and sprouts have been rinsed. The system may further include a packet with a calibrated quantity of seeds to produce the right quantity of sprouts. The quantity of the seeds can be calibrated based on a volume of the jar 100. The system for the seed sprouting may include the jar 200 instead of the jar 100, the seal lids 400 instead of the seal lids 300, and the perforated lids 600 instead of the perforated lids 500.

The method 3000 may commence, in block 3002, with attaching a seal lid to one of the ends of the jar while the other end is left open.

In block 3004, the method 3000 may include filling the jar with the seeds from the packet.

In block 3006, the method 3000 may proceed with filling the jar with an appropriate amount of water.

In block 3008, the method 3000 may continue with attaching a perforated lid to the open end of the jar.

In block 3010, the method 3000 may proceed with attaching the jar to the stand with the perforated lid up and the sealed lid down to allow the seeds to soak.

In block 3012, after a proper period of time, the method 3000 may proceed with inverting the jar. The jar can be removed from the stand and rotated 180 degrees to be positioned with the perforated lid down. The jar can then be attached back to the stand to allow the jar to drain into the tray integrated into the stand.

In optional block 3014, the method 3000 may further include removing the seal lid (which is now positioned up) from the jar and replacing the seal lid with a second perforated lid. Both ends of the jar then have perforated lids allowing for airflow.

Operations of blocks 3004-3014 can be repeated until sprouts are ready to be harvested after a few days. In block 3006, the jar may not be filled with seeds after the first draining. The seeds or sprouts needed to be rinsed by running water through the top perforated lid and into the jar and then allowing the water to drain out the bottom perforated lid. The jar can be shaken over the sink to remove excess water before attaching the jar back onto the stand to continue to drain into the tray integrated in the stand.

It should be noted that the process of sprout growth produces heat and thereby causes air to flow from the bottom perorated lid, through the jar and the seeds and sprouts, and out through the top perforated lid. The air flow allows to oxygenate the sprouts, promote growth, and reduce the chance of bacteria through stagnant water.

Figure 31:
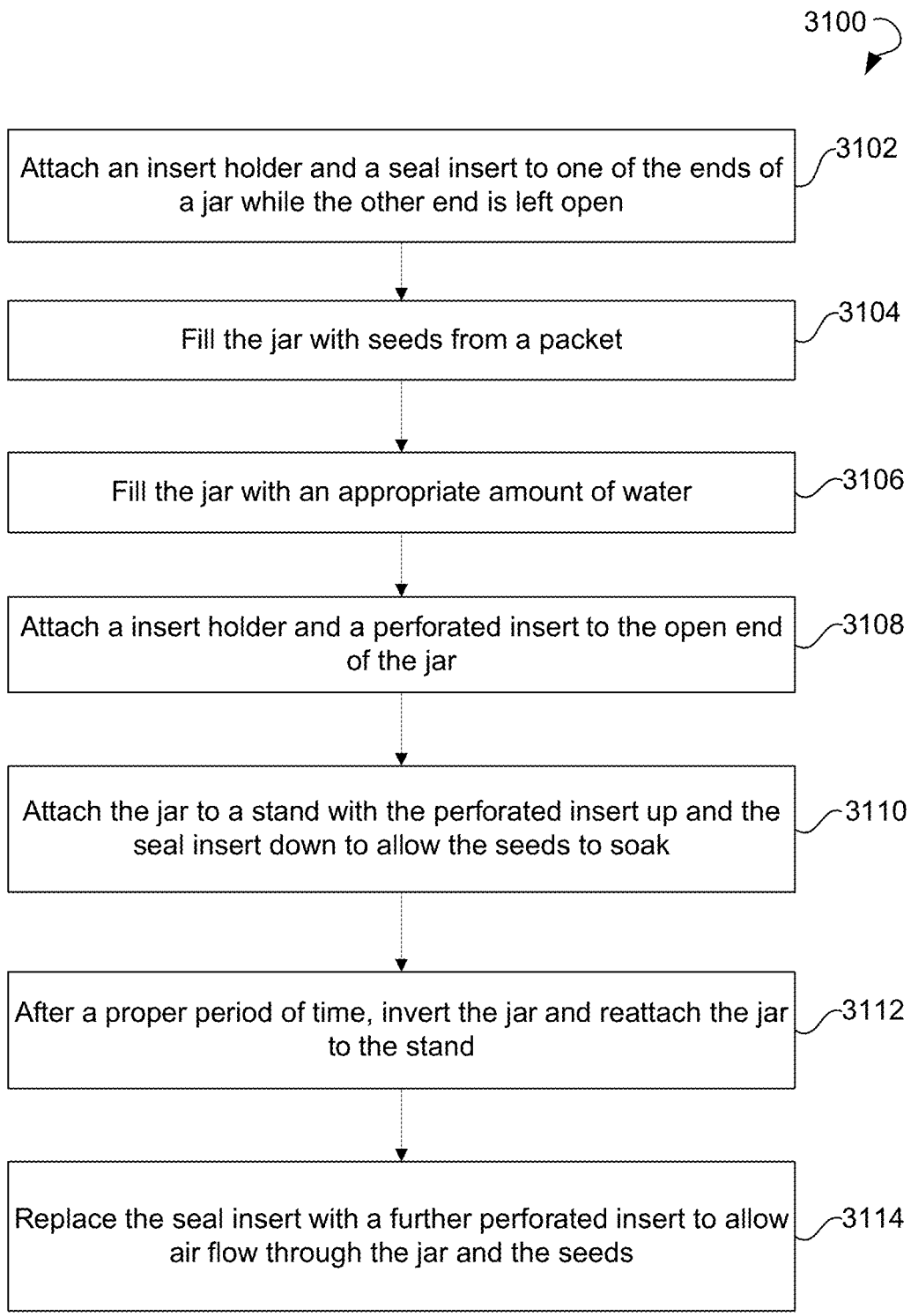
FIG. 31 is a flow chart showing a method 3100 for seed sprouting, according to some example embodiments.

FIG. 31 is a flow chart showing a method 3100 for seed sprouting, according to some example embodiments. The method 3100 can be performed using a system for seed sprouting. An example system may include a jar 100 with an opening at each end. The jar 100 can be made of any suitable material that allows for proper plant growth (preferably glass). The system may further include insert holders (for example 1300) and two types of inserts (for example, one or more seal insert 1500 and one or more perforated inserts 1700). The lids may be snapped on, screwed on, or otherwise securely affixed to the jar 100. The system may include a stand, for example 700 with a tray 740, or one of the stands 770, 1900, 1970, 2000, and 2070. The stand can be attached securely to the insert holder in order to position the jar 100 so the jar can drain after the seeds and sprouts have been rinsed. The system may further include a packet with a calibrated quantity of seeds to produce the right quantity of sprouts. The quantity of the seeds can be calibrated based on a volume of the jar 100 and species of the seeds. The system for the seed sprouting may include the jar 200 instead of the jar 100 and the insert holders 1700 instead of the insert holders 1500.

The method 3100 may commence, in block 3102, with attaching an insert holder and seal insert to one of the ends of the jar while the other end is left open.

In block 3104, the method 3100 may include filling the jar with the seeds from the packet.

In block 3106, the method 3100 may proceed with filling the jar with an appropriate amount of water.

In block 3108, the method 3100 may continue with attaching a further insert holder and perforated insert to the open end of the jar.

In block 3110, the method 3100 may proceed with attaching the jar to the stand with the perforated insert up and the sealed insert down to allow the seeds to soak.

In block 3112, after a proper period of time, the method 3100 may proceed with inverting the jar. The jar can be removed from the stand and rotated 180 degrees to be positioned with the perforated insert down. The jar can then be attached back to the stand to allow the jar to drain into the tray integrated into the stand.

In block 3114, the method 3100 may further include removing the seal insert (which is now positioned up) from the jar and replacing the seal insert with a second perforated insert. Both ends of the jar then have perforated inserts allowing for airflow.

Operations of blocks 3104-3114 can be repeated until sprouts are ready to be harvested after a few days. In block 3006, the jar may not be filled with seeds after the first draining. The seeds or sprouts needed to be rinsed by running water through the top perforated insert and into the jar and then allowing the water to drain out the bottom perforated insert. The jar can be shaken over the sink to remove excess water before attaching the jar back onto the stand to continue to drain into the tray integrated in the stand.

Thus, a system and a method for providing sprout incubation are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A seed sprouting kit comprising:
a jar having a top opening and a bottom opening;
a seal lid configured to be removably secured at the top opening of the jar;
a perforated lid configured to be removably secured at the top opening of the jar;
an insert holder configured to be removably secured at the bottom opening of the jar, the insert holder having an opening;
a perforated insert configured to be placed between the insert holder and the bottom opening of the jar; and
a seal insert configured to be placed between the insert holder and the bottom opening of the jar, wherein:
when being secured to the bottom opening of the jar, the insert holder in combination with the seal insert prevents an air flow and a water flow at the bottom opening; and
when being secured to the bottom opening of the jar, the insert holder in combination with the perforated insert provides the air flow and the water flow at the bottom opening.

2. The seed sprouting kit of claim 1, wherein the jar is made of one or more of the following: glass, plastic, wood, metal, ceramic, vinyl, and polymer.

3. The seed sprouting kit of claim 1, wherein
the jar is of one of the following shapes: a cylindrical shape, a triangular shape, a squared shape, a rectangular shape, a pentagonal shape, a hexagonal shape, and an octagonal shape.

4. The seed sprouting kit of claim 1, further comprising a seed packet containing seeds, a quantity of the seeds being calibrated based on a volume of the jar.

5. The seed sprouting kit of claim 1, wherein the perforated lid includes one or more holes to allow draining of water.

6. The seed sprouting kit of claim 1, further comprising a stand configured to support the jar vertically.

7. The seed sprouting kit of claim 6, further comprising a plurality of further jars and a plurality of further stands configured to support the further jars vertically, the stand and further stands being configurable to align with each other to form a jar farm.

8. The seed sprouting kit of claim 6, wherein the stand includes a tray for collecting the water drained from the jar, wherein the stand is configured to support the jar while leaving a space between the jar and the tray.

9. The seed sprouting system of claim 8, wherein the stand and one of the seal lid and the perforated lid are integrated into a single integrated unit, wherein the stand and one of the seal lid and the perforated lid are carried out as one of the following: a single piece of the single integrated unit and separable pieces of the single integrated unit.

10. The seed sprouting kit of claim 1, further comprising a plurality of two-dimensional cards, wherein each of the plurality of two-dimensional cards is associated with one of a species of seeds provided in seed packets, wherein a size of each plurality of two-dimensional cards represents a cross-section area of a volume that the seeds occupy inside the jar when the seeds sprout.

11. The seed sprouting kit of claim 1, wherein:
the seal lid is configured to be removably secured to the jar using a fastening means; and
the perforated lid is configured to be removably secured to the jar using the fastening means.

12. The seed sprouting kit of claim 1, wherein the insert holder is configured to be removably secured to the jar using a fastening means.

13. A method for seed sprouting, the method comprising:
providing a kit comprising:
a jar having a top opening and a bottom opening;
a seal lid configured to be removably secured at the top opening of the jar;
a perforated lid configured to be removably secured at the top opening of the jar; an insert holder configured to be removably secured at the bottom opening of the jar, the insert holder having an opening;
a perforated insert configured to be placed between the insert holder and the bottom opening of the jar; and
a seal insert configured to be placed between the insert holder and the bottom opening of the jar;
securing a combination of the insert holder and the seal insert at the bottom opening of the jar to prevent an air flow and a water flow at the bottom opening;
filling the jar with seeds;
filling the jar with an appropriate amount of water;
securing the perforated lid to the top opening of the jar; and
after a period of time:
inverting the jar by the bottom opening up; and
replacing the seal insert with the perforated insert to allow air flow through the jar.

14. The method of claim 13, wherein
the jar is of one of the following shapes: a cylindrical shape, a triangular shape, a squared shape, a rectangular shape, a pentagonal shape, a hexagonal shape, and an octagonal shape.

15. The method of claim 13, wherein the kit further comprises a seed packet containing the seeds, a quantity of the seeds being calibrated based on a volume of the jar.

16. The method of claim 13, wherein the perforated lid includes one or more holes to allow draining of the water.

17. The method of claim 13, wherein the kit further comprises
a stand configured to support the jar vertically.

18. The method of claim 17, wherein the stand includes a tray for collecting the water drained from the jar, wherein the stand is configured to support the jar while leaving a space between the jar and the tray.

19. The method of claim 13, further comprising replacing the perforated lid with the seal lid and replacing the perforated insert with seal insert after the seeds have sprouted to allow storing the sprouts.

20. A seed sprouting kit comprising:
a jar having a top opening and a bottom opening;
a seal lid configured to be removably secured at the top opening of the jar;
a perforated lid configured to be removably secured at the top opening of the jar;
an insert holder configured to be removably secured at the bottom opening of the jar, the insert holder having an opening;
a seal insert configured to be placed between the insert holder and the bottom opening of the jar; and
a perforated insert configured to be placed between the insert holder and the bottom opening of the jar, wherein:
when being secured to the bottom opening of the jar, the insert holder in combination with the seal insert prevents an air flow and a water flow at the bottom opening; and
when being secured to the bottom opening of the jar, the insert holder in combination with the perforated insert provides the air flow and the water flow at the bottom opening;
a seed packet containing seeds, a quantity of the seeds being calibrated based on a volume of the jar
a stand configured to
support the jar vertically, wherein the stand includes a tray for collecting the water drained from the jar.

21. The method of claim 13, wherein:
the seal lid is configured to be removably secured to the jar using a fastening means;
the perforated lid is configured to be removably secured to the jar using the fastening means; and
the insert holder is configured to be removably secured to the jar using a fastening means.

* * * * *